(12) United States Patent
Jørgensen et al.

(10) Patent No.: US 11,321,918 B2
(45) Date of Patent: May 3, 2022

(54) METHOD FOR MANIPULATING 3D OBJECTS BY FLATTENED MESH

(71) Applicant: 3SHAPE A/S, Copenhagen K (DK)

(72) Inventors: Jens Christian Jørgensen, Seattle, WA (US); Jens Peter Träff, Copenhagen K (DK); Alejandro Alonso Diaz, Copenhagen K (DK)

(73) Assignee: 3SHAPE A/S, Copenhagen K (DK)

( * ) Notice: Subject to any disclaimer, the term of this patent is extended or adjusted under 35 U.S.C. 154(b) by 254 days.

(21) Appl. No.: 16/801,863

(22) Filed: Feb. 26, 2020

(65) Prior Publication Data
US 2020/0273248 A1    Aug. 27, 2020

(30) Foreign Application Priority Data
Feb. 27, 2019   (DK) .............. PA 2019 70130

(51) Int. Cl.
*G06T 17/20* (2006.01)
*G06T 9/00* (2006.01)
*G06T 7/00* (2017.01)

(52) U.S. Cl.
CPC .......... *G06T 17/205* (2013.01); *G06T 7/0014* (2013.01); *G06T 9/001* (2013.01);
(Continued)

(58) Field of Classification Search
None
See application file for complete search history.

(56) References Cited

U.S. PATENT DOCUMENTS 9,226,806 B2 *   1/2016  Manai .................... A61C 11/00
10,445,931 B1 *  10/2019 Wrotek .................. G06T 9/001
(Continued)

FOREIGN PATENT DOCUMENTS

KR    101853237 B1    4/2018
WO   2004044787 A2    5/2004
(Continued)

OTHER PUBLICATIONS

Ahmed, Eman, Alexandre Saint, Abd El Rahman Shabayek, Kseniya Cherenkova, Rig Das, Gleb Gusev, Djamila Aouada, and Björn Ottersten. "Deep learning advances on different 3D data representations: A survey." arXiv preprint arXiv:1808.01462 1 (2018), 20 pages.

(Continued)

*Primary Examiner* — Mark K Zimmerman
*Assistant Examiner* — Jonathan M Cofino
(74) *Attorney, Agent, or Firm* — Buchanan Ingersoll & Rooney PC

(57) ABSTRACT

A computer-implemented method for generating a corresponding 3D mesh representing a 3D object includes transforming an initial three-dimensional mesh into a planar mesh, wherein each vertex or edge of the planar mesh is a transformation of a vertex or edge from the initial three-dimensional mesh; and sampling the planar mesh to generate a plurality of samples such that each sample comprises a three-dimensional coordinate representing a point in a three-dimensional space derived and/or taken directly from the initial three-dimensional mesh, and a coordinate representing a position of the sample relative to other samples; and generating the sampled matrix based on the plurality of samples; and representing the sampled matrix as a corresponding 3D mesh.

11 Claims, 17 Drawing Sheets

(52) U.S. Cl.
CPC ............... *G06T 2207/10028* (2013.01); *G06T 2207/30036* (2013.01)

(56) References Cited

U.S. PATENT DOCUMENTS

| | | | | |
|---|---|---|---|---|
| 10,613,515 | B2* | 4/2020 | Cramer | B33Y 50/02 |
| 10,660,728 | B2* | 5/2020 | Maraj | G06T 19/006 |
| 2012/0072177 | A1* | 3/2012 | Manai | A61C 11/00 703/1 |
| 2018/0110590 | A1* | 4/2018 | Maraj | A61C 13/0004 |
| 2018/0284727 | A1* | 10/2018 | Cramer | B33Y 50/00 |
| 2019/0304184 | A1* | 10/2019 | Wrotek | G06T 9/001 |

FOREIGN PATENT DOCUMENTS

| | | | |
|---|---|---|---|
| WO | 2017220619 | A1 | 12/2017 |
| WO | 2018067978 | A1 | 4/2018 |

OTHER PUBLICATIONS

Belkin, Mikhail, Jian Sun, and Yusu Wang. "Discrete laplace operator on meshed surfaces." In Proceedings of the twenty-fourth annual symposium on Computational geometry, 2008, pp. 278-287.

Floater, Michael S. "Mean value coordinates." Computer aided geometric design 20, No. 1 (2003): pp. 19-27.

Floater, Michael, et al. "Polygonal spline spaces and the numerical solution of the Poisson equation" SIAM Journal on Numerical Analysis 54.2 (2016), pp. 797-824.

Goodfellow, Ian. "NIPS 2016 tutorial: Generative adversarial networks." arXiv preprint arXiv:1701.00160 (2016), pp. 1-57.

Hormann, Kai, Bruno Levy, and Alla Sheffer. "Mesh parameterization: Theory and practice." (2007), pp. 1-122.

Kittler et al.; Conformal mapping of a 3D face representation onto a 2D image for CNN based face recognition. In: International Conference on Biometrics, Feb. 20-23, 2018. INSPEC Accession No. 17918222, 9 pages.

Litjens, Geert, Thijs Kooi, Babak Ehteshami Bejnordi, Arnaud Arindra Adiyoso Setio, Francesco Ciompi, Mohsen Ghafoorian, Jeroen Awm Van Der Laak, Bram Van Ginneken, and Clara I. Sánchez. "A survey on deep learning in medical image analysis." Medical image analysis 42 (2017): 60-88, pp. 1-38.

Marchand et al; "Graphics and GUIs with Matlab". London: Chapman & Hall/CRC, 2003, ISBN 1-58488-320-0 Section 4.1.1, 4.1.11; figure 4.29, pp. 1-524.

Meyer, Mark, et al. "Discrete differential-geometry operators for triangulated-manifolds", Visualization and mathematics III. Springer, Berlin, Heidelberg, 2003. 35-57, pp. 1-26.

Sheffer, Alla, Emil Praun, and Kenneth Rose. "Mesh parameterization methods and their applications." Foundations and Trends® in Computer Graphics and Vision 2, No. 2 (2006): 105-171, pp. 1-23.

Sorkine, Olga. "Laplacian mesh processing." Eurographics (STARs) 29 (2005), pp. 1-18.

Sporring et al; "Bayes Reconstruction of Missing Teeth". Journal of Mathematical Imaging and Vision, Jul. 2008, vol. 31, Issue 2-3, Sections 1-5; figures 1, 5-7, pp. 245-254.

Tutte, William Thomas "How to draw a graph", Proceedings of the London Mathematical Society 3.1 (1963) pp. 743-767.

Wilson, Robin J. Introduction to graph theory. Pearson Education India, 1979, 180 pages.

Danish Patent and Trademark Office, 1st technical examination of Patent Application PA 2019 70130, and Danish Search Report dated Aug. 15, 2019.

* cited by examiner

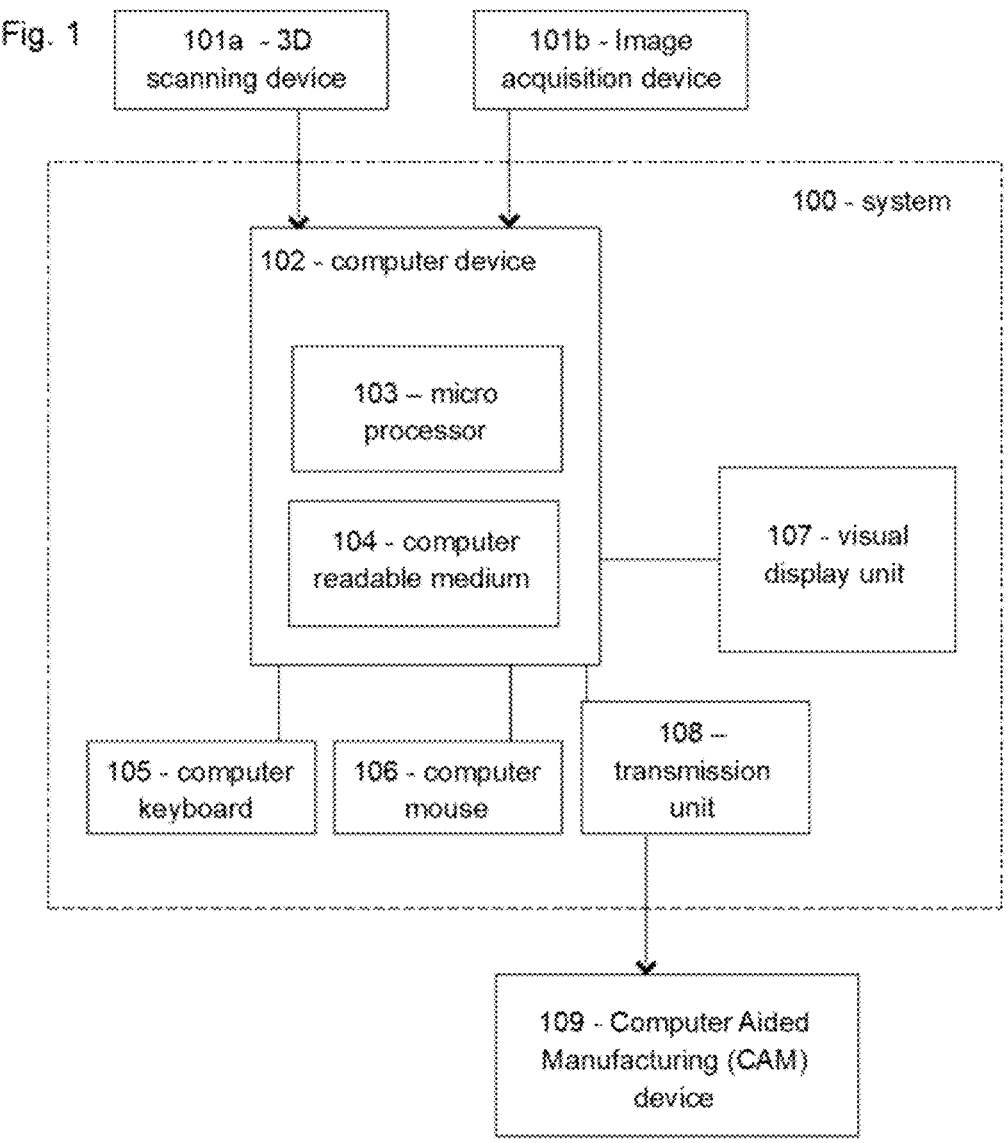

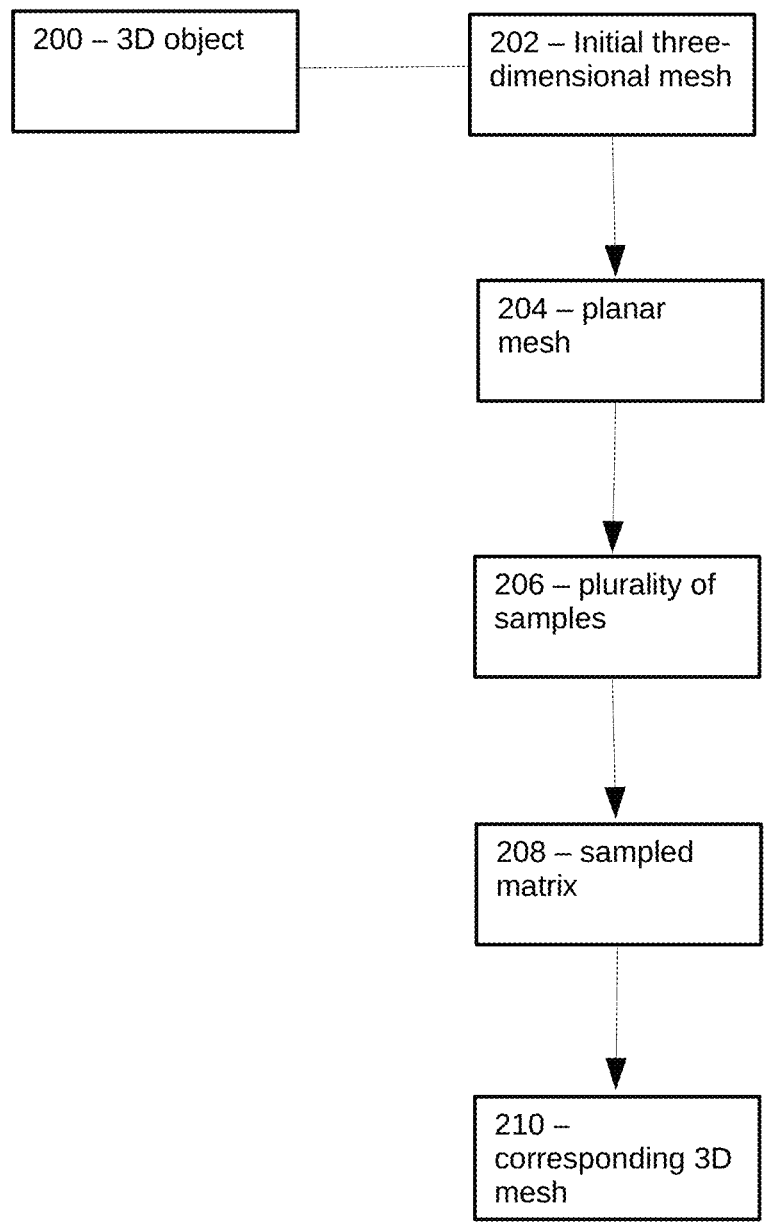

FIG. 5A
500 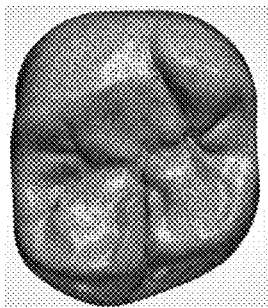
501 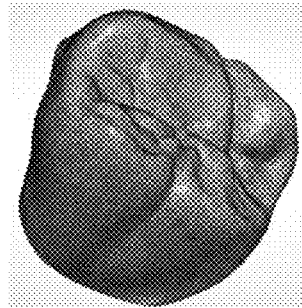
502 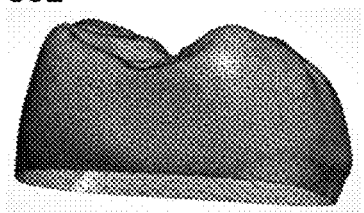
FIG. 5B
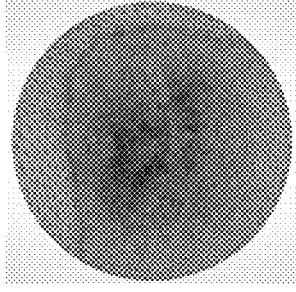
FIG. 5C
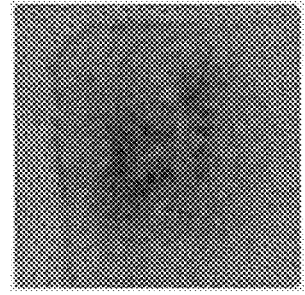
FIG. 5D
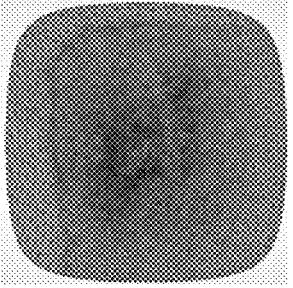
FIG. 5E
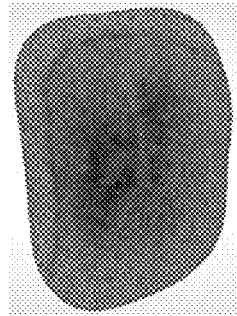
FIG. 5F
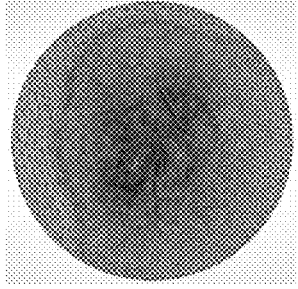
FIG. 5G
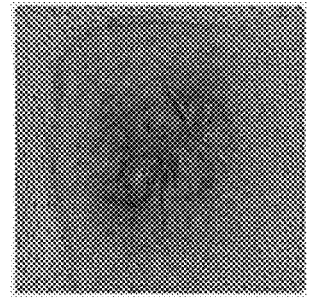
FIG. 5H
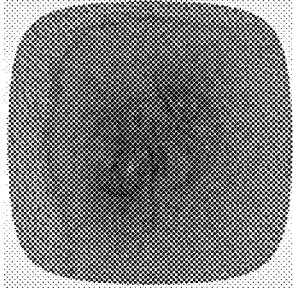
FIG. 5I
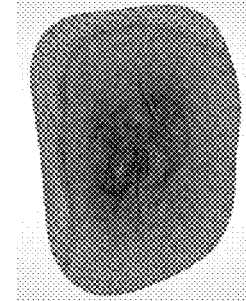
FIG. 5J
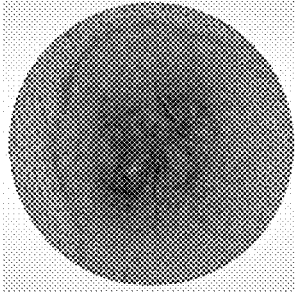
FIG. 5K
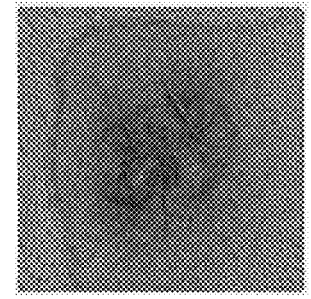
FIG. 5L
FIG. 5M
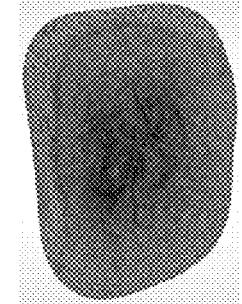

903
$$\begin{bmatrix} \vdots \\ -0.893 & -0.826 & -0.812 & \ldots \\ -0.795 & -0.729 & -0.719 & \ldots \\ -0.698 & -0.637 & -0.626 & \ldots \\ \vdots \end{bmatrix}$$

904
$$\begin{bmatrix} \vdots \\ -5.709 & -5.962 & -6.273 & \ldots \\ -5.690 & -6.052 & -6.342 & \ldots \\ -5.667 & -6.139 & -6.408 & \ldots \\ \vdots \end{bmatrix}$$

905
$$\begin{bmatrix} \vdots \\ -2.701 & -2.270 & -1.977 & \ldots \\ -2.581 & -2.223 & -1.941 & \ldots \\ -2.491 & -2.177 & -1.919 & \ldots \\ \vdots \end{bmatrix}$$

906
$$\begin{bmatrix} \vdots \\ [-0.893, -5.709, -2.701] & [-0.826, -5.962, -2.270] & [-0.812, -6.273, -1.977] & \ldots \\ [-0.795, -5.690, -2.581] & [-0.729, -6.052, -2.223] & [-0.719, -6.342, -1.941] & \ldots \\ [-0.698, -5.667, -2.491] & [-0.637, -6.139, -2.177] & [-0.626, -6.408, -1.919] & \ldots \\ \vdots \end{bmatrix}$$

FIG. 9C

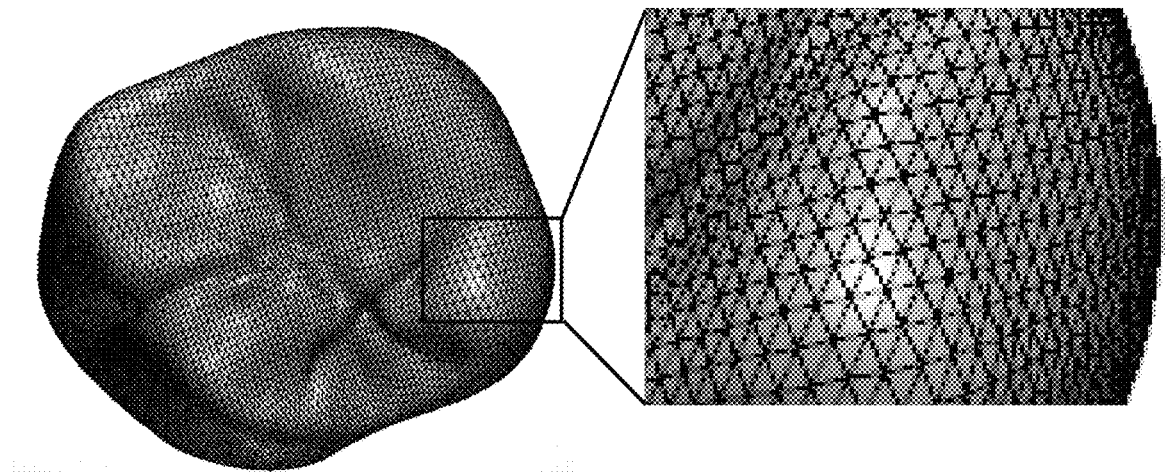

FIG. 10
10A
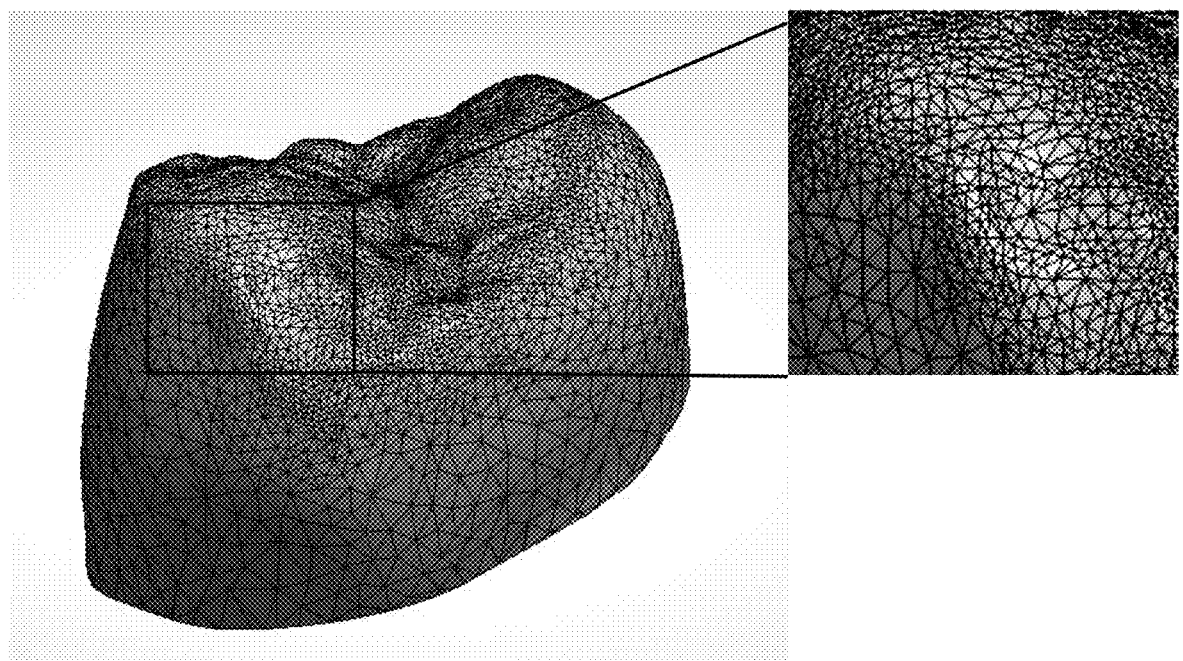
10B
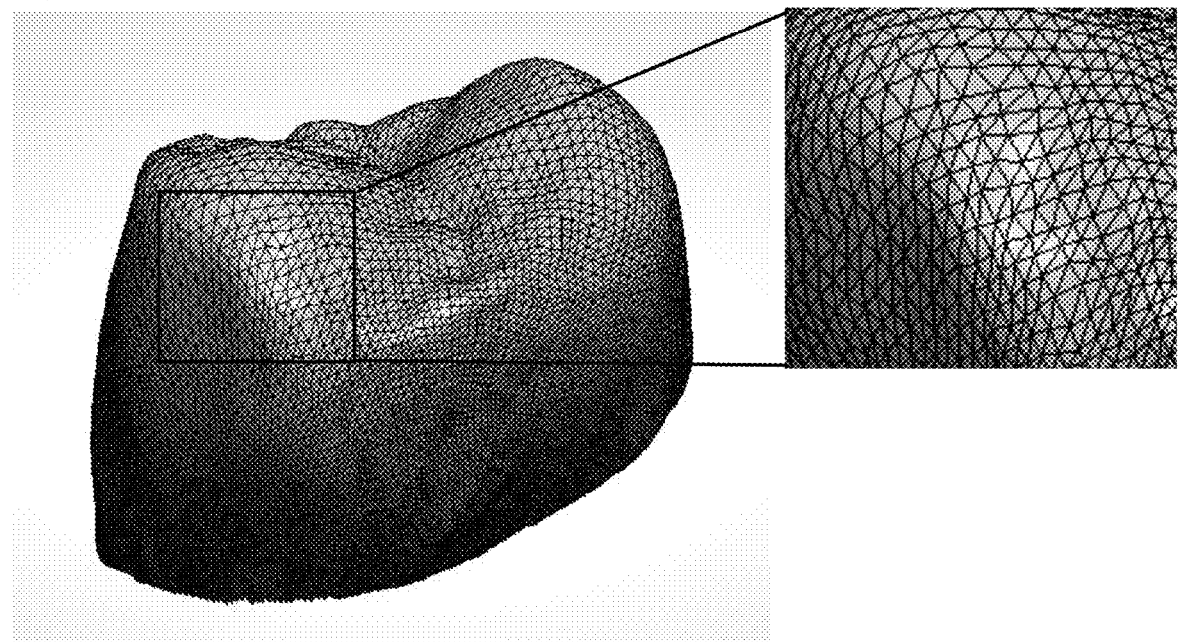

FIG. 11
1101
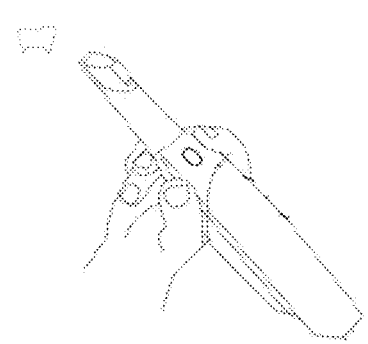
1102
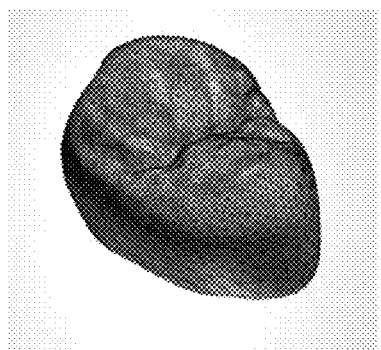
1103
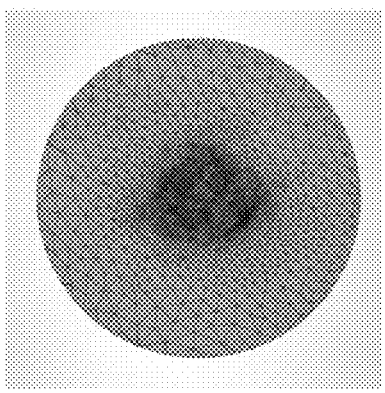
1104
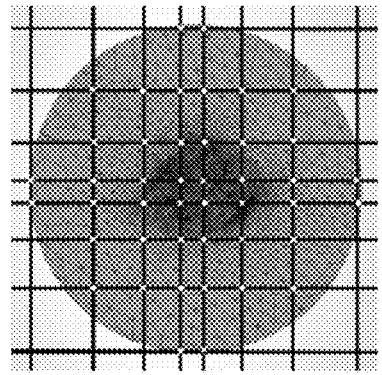
1105
$$\begin{pmatrix} a_{11} & a_{12} & a_{13} & \cdots & a_{1m} \\ a_{21} & a_{22} & a_{23} & \cdots & a_{2m} \\ a_{31} & a_{32} & a_{33} & \cdots & a_{3m} \\ \vdots & \vdots & \vdots & \vdots & \vdots \\ a_{n1} & a_{n2} & a_{n3} & \cdots & a_{nm} \end{pmatrix}$$
1106
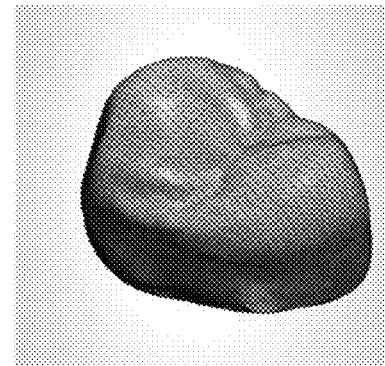

1500
1501

1502
1503

1504
1505

1506
1507

1508
1509

FIG. 15F – Accuracy Table

|  | Original (15A) | Scale (15B) | PC 1 (15C) | PC 10 (15D) | PC 50 (15E) |
|---|---|---|---|---|---|
| Summed distances (mm) | 4982.70449913656 | 4579.78211992065 | 1055.02223478478 | 560.128736905386 | 337.369757047291 |
| 95th percentile distance (mm) | 1.92538948699446 | 1.58755269864847 | 0.332670389682277 | 0.174840988458248 | 0.103052874665249 |
| Weighted Average Distance (mm) | 0.723102578717642 | 0.685907622012622 | 0.161423644402128 | 0.089787113400297 | 0.0509680345760379 |

FIG. 16A
1601   1602 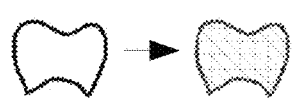  1603 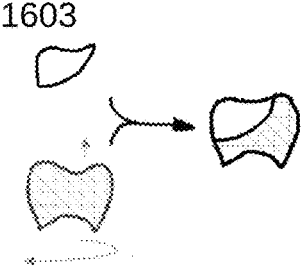
FIG. 16B
1604 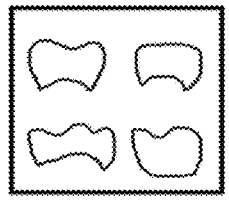  1605 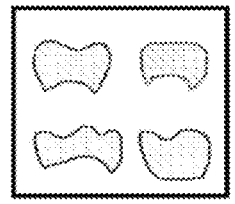  1606 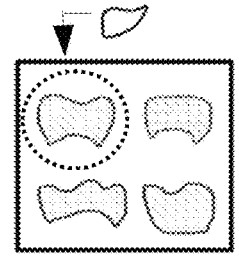  1607 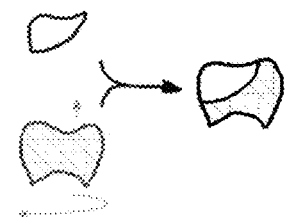
FIG. 16C
1608   1609 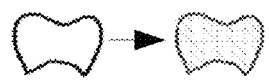  1610 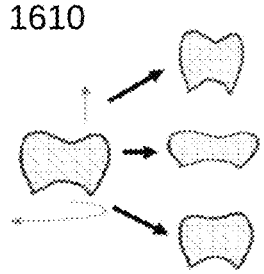  1611 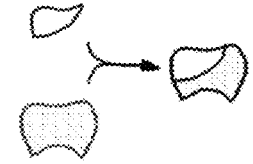

FIG. 17
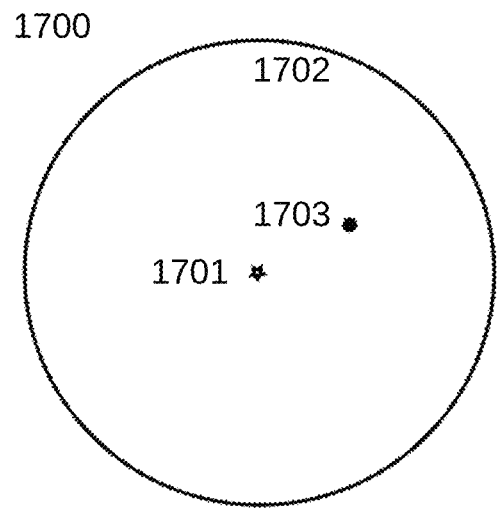
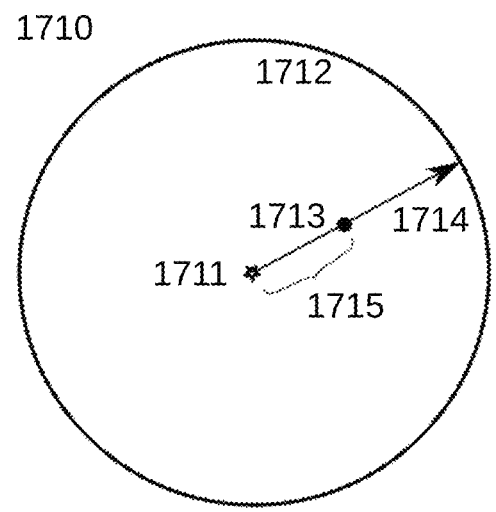
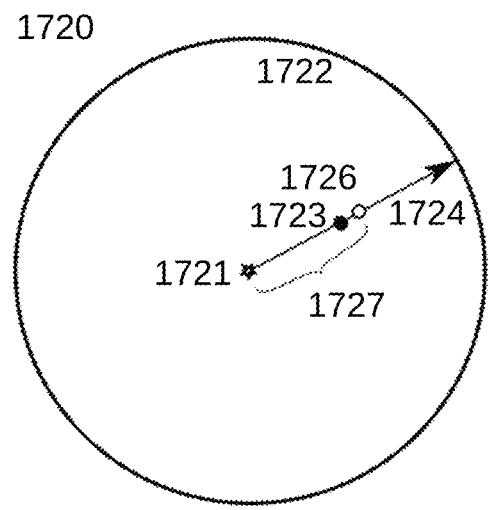
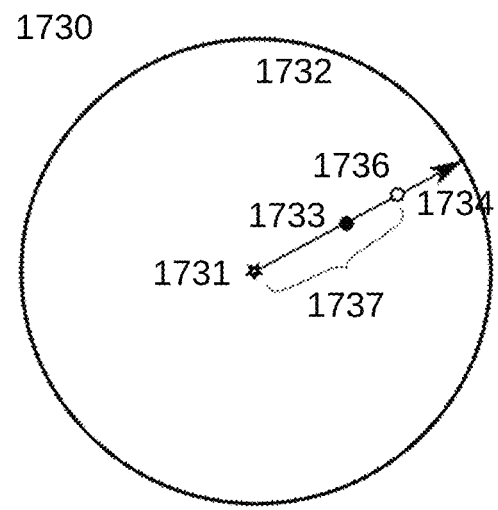

METHOD FOR MANIPULATING 3D OBJECTS BY FLATTENED MESH

FIELD

The disclosure generally relates to a system and a method for manipulating three-dimensional objects using machine learning methods, by converting a representation of a three-dimensional object into a matrix format and corresponding 3D mesh upon which machine learning algorithms can be used. More particularly, various embodiments of the disclosure relate to applying these methods to dental, orthodontic, and ear-related objects.

BACKGROUND

Machine learning is useful for deriving information from large sets of data and using that data in novel ways. However, applying these methods to three-dimensional objects may be challenging. Often, existing machine learning methods rely largely on uniform sets of data with distinct features. Three-dimensional objects are often non-uniform, with indefinite features. Further, data formats representing three-dimensional objects can be very large, requiring a lot of processing power to analyze. Finally, some operations used in machine learning do not exist for 3D data formats, for example, the convolutions used in convolutional neural networks. Thus, three-dimensional objects present difficulties for machine learning.

SUMMARY

Disclosed is a computer-implemented method for generating a sampled matrix representing an initial three-dimensional mesh, the method comprising
  transforming the initial three-dimensional mesh into a planar mesh, the initial three-dimensional mesh comprising a first set of vertices and edges and the planar mesh comprising a second set of vertices and edges, wherein
    each vertex of the second set of vertices is a transformation of a vertex from the first set of vertices and comprises values of the vertex from the first set of vertices, and
    each edge of the second set of edges is a transformation of an edge from the first set of edges and comprises values of the edge from the first set of edges;
  sampling the planar mesh to generate a plurality of samples such that each sample from the plurality of samples comprises
    a three-dimensional coordinate comprising three numerical values representing a point in a three-dimensional space where the three numerical values are derived and/or taken directly from the initial three-dimensional mesh, and
    a coordinate comprising numerical values representing a position of the sample relative to other samples of the plurality of samples; and
  generating the sampled matrix based on the plurality of samples.

The method of this disclosure overcomes some of the difficulties of applying machine learning to three-dimensional objects by enabling a uniform data format for different three-dimensional objects, reducing the size of the data format to be processed, and allowing two-dimensional machine learning methods to be used. The method flattens three-dimensional objects into two-dimensional objects, representing them as matrices. Further, the matrices may be a uniform data format to represent different objects. As many machine learning methods use matrix operations and/or require uniform data formats, this allows for both the parametrization and manipulation of the original three-dimensional object.

In various embodiments, the method may be particularly useful in generating dental, orthodontic, and ear-related objects, as discussed below.

A three-dimensional object is an object that exists in three dimensions. In various embodiments of this disclosure, three-dimensional objects include, but are not limited to: physical objects such as dental restorations and dentition, digital objects such as models of individual teeth and scans of physical objects such as dental restorations and ears.

Three-dimensional objects may be represented in several ways. Two-dimensional representations of three-dimensional objects include but are not limited to: depth maps, pseudo-images based on facet information, and other multi-angle images. Three-dimensional representations of three-dimensional objects include but are not limited to: volumetric representations, point clouds, primitive-based models, meshes.

The method disclosed uses a mesh to represent a three-dimensional object. A mesh is a collection of vertices, edges, and faces. Vertices are individual points representing the surface, edges are lines connecting the vertices, and faces are continuous areas surrounded by vertices and edges.

Although some embodiments in this disclosure use three-dimensional meshes from three-dimensional scans, any three-dimensional mesh that can be embedded in a plane may be used.

An initial three-dimensional mesh may come from an open surface or a closed surface. Examples of an open surface include but are not limited to: the outer surface of a crown, a 3D scan of a tooth to the gingival margin, a 3D scan of a jaw. Examples of closed surfaces include but are not limited to: the entire surface of a crown, a three-dimensional model of a tooth, a 3D scan of an implant guide.

To flatten the initial three-dimensional mesh to a planar mesh, a boundary should be set. In an embodiment with a three-dimensional object with an open surface, this boundary may be the open surface's boundary, a cut made along the surface, and/or a combination of the two.

In an embodiment with a three-dimensional object with a closed surface of genus zero, the boundary may be a single facet, or at least one cut along the surface. For closed surfaces, there may be an obvious place to cut, such as the edge between top and bottom. In a three-dimensional mesh of a tooth, places to cut include but are not limited to: anatomical features such as the gingival margin, the long axis of a tooth; geometric features such as the plane along a hemisphere; and/or any axes orthogonal to these.

Cutting a three-dimensional mesh may result in multiple planar meshes. This may be useful for capturing more details of the three-dimensional object.

The boundary of the surface of the three-dimensional object is then fixed to a boundary of a planar object. The planar object may be of different shapes, including but not limited to: triangles, quadrilaterals, circles, curved quadrilaterals including squircles, shapes based on the three-dimensional objects themselves.

In an embodiment, the planar mesh may be a unit circle. A unit circle is a circle having a radius of one unit, often with its center at (0,0). Here, the boundary of the planar mesh would be set to such a circle. Thus, the coordinates of any point on the mesh would be between −1 and 1. Setting the planar mesh to the unit circle may be particularly useful where the planar mesh needs to be stretched. The unit circle allows for uniform stretching, since unlike a unit square, a circle has no corners and is thus not as susceptible to distortions at those corners.

Once the boundaries are fixed, the remaining vertices and edges are mapped to the planar object, flattening the initial three-dimensional mesh to a planar mesh. Various embodiments may use different methods for this mapping. Initially, a matrix of each vertex's connectivity to other vertices may be created, and solving the system of the matrix maps the coordinates of each vertex to the plane (Tutte, William Thomas. "How to draw a graph." Proceedings of the *London Mathematical* Society 3.1 (1963): 743-767). This connectivity may be weighted in different ways, resulting in different mappings. In various embodiments, these methods include but are not limited to: uniform weights (Tutte 1963), weights based on angles (Floater, Michael S., and Ming-Jun Lai. "Polygonal spline spaces and the numerical solution of the Poisson equation." *SIAM Journal on Numerical Analysis* 54.2 (2016): 797-824), weights based on cotangents (Meyer, Mark, et al. "Discrete differential-geometry operators for triangulated 2-manifolds." *Visualization and mathematics III*. Springer, Berlin, Heidelberg, 2003. 35-57).

For examples of flattening initial three-dimensional scans to planar meshes, see below.

An advantage of flattening the initial three-dimensional meshes in this manner is that the initial three-dimensional mesh and the planar mesh are bijective, meaning that each vertex can be mapped back and forth between the two meshes.

The planar mesh is then sampled, where each sample is a point on the planar mesh. The planar mesh can be sampled randomly, with a lattice, or a combination of the two.

Lattice sampling takes samples based on a lattice over the planar mesh. In various embodiments, lattices may be based on polar coordinates or rectangular coordinates, regular or irregular. A regular lattice has evenly spaced lines, such as a regular grid of squares or triangles.

An embodiment further comprises sampling the planar mesh based on polar coordinates.

Polar coordinates are a coordinate system where location is based on a radius r and an angle θ. A point (r, θ) would be located at a distance of r from the center, at an angle of θ from what would be the x-axis of a Euclidean plane. Sampling here might be set at different values of r and θ, as discussed below.

Polar coordinates may be particularly useful in evaluating planar meshes that are circles or higher-ordered polygons, as they are better suited to fit those shapes. For example, in sampling a circle with a grid, the four corners of the grid are typically null information since there is nothing to sample there. Using polar coordinates would reduce the space needed to evaluate null coordinates. Further, where information is clustered at the center, polar coordinates may better capture that information. Since the values of r closer to the center may easily be sampled the same number of times as values of r closer to the boundary, making a matrix for a neural network may be simpler.

An embodiment further comprises sampling the planar mesh with an irregular lattice.

An irregular lattice lacks evenly spaced lines, and may be useful where information is unevenly distributed. For example, a planar mesh of the surface of a tooth with the boundary set at the gingival margin has more information at the center of the mesh than at the edges. Thus, an irregular lattice that gathers more samples from the center has more useful information about the tooth. For further examples, see below.

Samples based on a lattice may be taken from the intersections of the lines, different positions along the lines, or even from the cells of the lattice. Lattice sampling may be combined with random sampling, for example, choosing a random point from each lattice cell.

Each sample on the planar mesh has a corresponding three-dimensional Euclidean coordinate based on the initial three-dimensional mesh. If the sample is on a vertex, the Euclidean coordinate is identical to the vertex. If the sample is on an edge or face, the Euclidean coordinate is interpolated based on the vertices of the edge or face.

Each sample also has a location on the lattice. This lattice may be the basis for a sampled matrix, where each element of the matrix is a sample, and each element's location corresponds to the sample's lattice location. The sampled matrix may be regarded as a two-dimensional array with elements of three dimensions each, as three two-dimensional arrays with elements of one dimension each, or any other format that conveys both the samples' Euclidean coordinates and lattice location.

The sampled matrix can be visually represented as a two-dimensional red-green-blue matrix (2D RGB matrix). In the 2D RGB matrix, each matrix element's location is a sample's lattice location, and each matrix element's RGB value is the sample's Euclidean coordinates. The 2D RGB matrix is equivalent to the sampled matrix, and the two can be translated back and forth.

The sampled matrix may be analyzed using machine learning methods for two-dimensional data. This requires less computing power than similar methods for three-dimensional data. Further, there is a wider body of work on two-dimensional machine learning methods, potentially allowing novel methods that could not previously be applied to three-dimensional objects.

Because each element of the sampled matrix has a specific location in relation to its neighboring elements, machine learning methods requiring known neighboring elements can be applied. For example, convolutions pool several neighboring elements, to better capture the underlying information about an object and reduce the risk of chance variations changing the overall result. These are used in convolutional neural networks.

The sampled matrix also has other advantages. The sampled matrix can represent an object with fewer data points, requiring less processing power. Further, the sampled matrix allows a uniform data format for non-uniform objects, permitting direct comparisons between 3D objects.

The disclosure further comprises representing the sampled matrix as a corresponding 3D mesh. As each element of the sampled matrix includes a three-dimensional point in Euclidean space, it can also be represented as a point cloud. Analyses done of the sampled matrix would also be analyses of the point cloud, and manipulations of the sampled matrix would have corresponding effects on the point cloud.

The point cloud can be reconnected into a three-dimensional mesh. While the point cloud can be reconnected in any way, a triangular mesh is typical for computer-aided design and manufacturing.

In a further embodiment, the corresponding 3D mesh is a triangular mesh.

In applications where 3D models are generated, triangular meshes may be useful as a stable shape that does not fold in on itself, and has reduced calculation times when acting on the entire mesh, for example in triangulation, as compared to a quadrilateral mesh.

One embodiment further comprises the corresponding 3D mesh as a consistently connected mesh, where the consistently connected mesh is a mesh with a consistent number of neighboring vertices for each vertex, unless said each vertex is on the boundary of the mesh. This can mean the same number of neighboring vertices for each non-boundary vertex, for examples, a mesh with quadrilateral faces with four neighboring vertices per non-boundary vertex, and a mesh with triangular faces with six neighboring vertices per non-boundary vertex. There need not be the same number of neighboring vertices, so long as the number of neighboring vertices is predictable, as discussed later. Examples of consistently connected meshes are below.

The consistently connected mesh of a corresponding mesh is particularly useful when the mesh connections reflect each vertex's sampled matrix location. Corresponding 3D meshes with information about the sampled matrix location can be translated back and forth from the sampled matrix.

An embodiment further comprises moving at least one vertex of the planar mesh based on its distance from a center and/or boundary of the mesh.

As discussed above, in a planar mesh, information about the 3D object may be unevenly distributed. A planar mesh based on a tooth, for example, may have far more detail about the cusps and fissures at the top of the tooth embedded at the center, rather than the relatively smooth surfaces of the sides. One method to compensate for this is to "stretch" the mesh, i.e. move vertices according to their distance from the center or boundary of the mesh.

In an embodiment, at least one vertex on the planar mesh is moved based on its distance from a center/boundary of the planar mesh. The center of the planar mesh is found, and a line drawn between the center and the vertex to be moved, extending to the boundary. The vertex to be moved is then moved along the line towards the boundary. Embodiments for moving a vertex are discussed in more detail below.

In some embodiments, the initial three-dimensional mesh is derived and/or generated from a three-dimensional scan of a physical object. Examples of a physical object include but are not limited to: a tooth, a dental restoration, an ear, gingiva, jaw, and/or any portion or combination thereof. A physical object contains information that is useful for analysis, by itself or as part of a larger data set. The physical object may also be useful as the basis for transformations into another physical object. A three-dimensional mesh of a physical object is easier to analyze and manipulate than the object itself.

A three-dimensional mesh may be relatively easy to derive from a three-dimensional scan. 3D scanners may use structured light to scan the surface of a three-dimensional object. The light bouncing off the object gives a data point that comprises both a single point in three-dimensional space, and the angle of the surface at that point. This is conducive to building 3D meshes, as the faces of the meshes can be based on this information.

In some embodiments, machine learning is applied to the sampled matrix to generate a transformed 3D mesh and/or derive information from the initial three-dimensional mesh. Machine learning methods are useful in analyzing the properties of different objects for information and manipulating them based on that information. Many machine learning methods rely on matrix operations and/or a uniform data set. The sampled matrix allows machine learning methods to be performed on three-dimensional objects. For further discussion, see below.

Machine learning methods include but are not limited to: principal component analysis, kernel principal component analysis, linear discriminant analysis, generalized discriminant analysis, singular value decompositions, convolutional neural networks, deep neural networks, dense neural networks, recurrent neural networks, other artificial neural networks not yet mentioned, decision trees, random forests, support vector machines, nearest neighbor methods, gradient boosting, regression (linear or non-linear), a portion thereof, and/or any combination thereof.

Many machine learning methods require training with training data, which comprises training input data and training target data. A machine learning method takes input data and returns output data. To train a machine learning method, the output data is expected to at least substantially match the training target data, with changes made to the machine learning method to obtain this result. Once the machine learning method is trained, it can generate output data similar to the training target data, even with new input data.

An embodiment applies a principal component analysis (PCA) to a plurality of sampled matrices. In PCA, a data set is analyzed in a higher-dimensional space to find a set of principal components, which are the directions in which the data varies most.

The method of this disclosure allows PCA for 3D objects. PCA requires uniform data, where each input data point has the same format as the other input data points. Initial scans of physical objects are unlikely to be uniform. Any two scans may have different vertices, different edges connecting them, and thus different faces. It can be difficult to find comparable vertices between scans, and even more difficult to match the entire scan. Processing scans into sampled matrices allows a comparable input data format for different objects, a requirement for PCA.

The number of principal components is limited to one less than the number of objects in the plurality. However, as each subsequent principal component explains less of the variation in the plurality, earlier principal components are more useful for both analyzing the objects and making changes to them.

One advantage of PCA is that principal components can be used as parametrizations of the objects, to analyze and manipulate an object.

One embodiment applies at least one neural network to a plurality of sampled matrices. Neural networks are machine learning algorithms that predict output data from input data through at least one layer of neurons. There may be multiple layers of neurons in a neural network.

A neural network is trained on a set of training data, comprised of a set of training input data and a set of training target data. To train a neural network, the training input data is input into the neural network, which then outputs a set of output data. The output data is compared to the training target data, and information on how well the output data matches the training target data is used to correct the weights of each neuron in a process called backpropagation. The process of inputting data and backpropagation is repeated until the neural network's output data is similar enough to the training target data for the purposes of the application.

Neural networks are a series of matrix operations. The sampled matrix disclosed allows the matrix operations required for a neural network to be carried out. Further, because the sampled matrix can provide a uniform data format for a plurality of objects, the training data set can be created from different objects.

Applying neural networks directly to meshes, point clouds, and other representations of three-dimensional objects may require enormous computational power. The disclosed sampled matrix may reduce the number of data points, and therefore, the processing required.

For example, a raw three-dimensional scan of the surface of a tooth may have 20,000 to 25,000 vertices. By sampling the planar mesh, the number of vertices may be significantly reduced, while still preserving the information of the three-dimensional object scanned.

In a convolutional neural network, convolutions are used, which combine elements with their neighboring elements. This may help avoid arbitrary effects from random variations in data.

Convolutions, however, are difficult to apply directly to a raw three-dimensional scan. A raw three-dimensional scan of an object has an arbitrary number of neighboring vertices for each vertex; it is difficult, if not impossible to figure out which vertices to pool. The disclosed sampled matrix allows convolutions for the data set, thus enabling convolutional neural networks for the underlying three-dimensional objects.

Another type of neural network is a dense neural network, where there are connections between each neuron in neighboring layers. Dense neural networks may require significantly more processing power than other neural networks, as so many calculations are made. By reducing the number of vertices while preserving the underlying information of the three-dimensional object, the disclosed sampled matrix allows dense neural networks to be applied to complex three-dimensional objects.

In some embodiments of this disclosure, a 3D object is generated or filled in by using the matrix representing a three-dimensional mesh in a computer-implemented method for generating output data. The method includes: training an autoencoder on a first set of training input data to identify a first set of latent variables and generate first set of output data, where the autoencoder comprises a first encoder, and a first decoder, where the first encoder converts the first set of input data into a first set of latent variables, where the first decoder converts the first set of latent variables to the first set of output data, where the first set of output data is at least substantially the same as the first set of training input data;

training an hourglass predictor to return a second set of latent variables, where the hourglass predictor comprises a second encoder and the first decoder, where the second encoder converts a second set of training input data to the second set of latent variables, where the second set of latent variables has a comparable data format as the first set of latent variables, the first decoder converts the second set of latent variables into a second set of output data at least substantially the same as a set of training target data, and the second set of training input data is different from the first set of training input data; and using the hourglass predictor on a third set of input data to generate a third set of output data, where the third set of output data is a comparable data format to that of the first set of output data.

The hourglass predictor may be configured to generate an object based not only on similar objects, but also related objects. For example, an embodiment uses the hourglass predictor to generate a dental crown based on dental surroundings from a dental patient. A crown is a type of dental restoration which caps or covers a tooth to restore it to normal shape, size, or function. Dental surroundings are the collection of objects around the crown or the preparation for the crown, including but not limited to: neighboring teeth, antagonist teeth, gingiva, jaw, and/or preparations. Currently, crowns are often made by hand or manually designed using CAD software, based on the judgment of a dental professional. This is time-consuming, and highly dependent on the individual judgment of the dental professional.

A typical machine learning approach generates new objects based on existing ones of the same type. For example, a dental crown may be generated by training a machine learning method on a large data set of existing dental crowns. However, a dental crown generated in this way does not take into account the unique circumstances of the dental surroundings, for example, the space available. The hourglass predictor adds information from the dental surroundings to generate a crown similar to a crown a dental professional may have made for a unique set of dental surroundings. This embodiment is a single example of the flexibility of the hourglass predictor, as the hourglass predictor can be used with any related sets of input data.

The first step in creating an hourglass predictor is to train an autoencoder. Autoencoders take input data, encode the input data into a set of latent variables, then decode the latent variables into output data, where the output data is at least substantially the same as the input data, as discussed below. They are frequently used for denoising applications, such as removing artefacts from digital photos. The object itself may be difficult to use as input data, and therefore, a representation of the object may be used instead. For example, a 2D image may represent a tooth.

One embodiment uses a variational autoencoder. A variational autoencoder is an autoencoder where the latent variables are generated from a probability distribution rather than directly from the encoder. Using the probability distribution allows for interpolation of the data, so that a reasonable estimate might be made where there is no similar input data. This probability distribution may be, for example, generated from a means and standard deviations vector or logarithms of variance.

To train an autoencoder, a first encoder converts a first set of training input data into a first set of latent variables, then a first decoder converts the first set of latent variables to a first set of output data. Both encoder and decoder may be neural networks. Examples of neural networks include but are not limited to convolutional neural networks and dense neural networks.

The autoencoder first set of training input data may be a plurality of sampled matrices. The first encoder may then encode the sampled matrices into latent variables. In this embodiment, there are at least three latent variables, and each latent variable is a scalar number. The first decoder then decodes each of the first set of latent variables back to a sampled matrix. As discussed above, the disclosed sampled matrix enables neural networks to be applied to three-dimensional objects, and also enables a plurality of three-dimensional objects be given consistent treatment, such that they can be compared to each other.

The training is complete when the first set of output data is at least substantially the same as the first set of input data. In an embodiment where the autoencoder is used to generate dental crowns, this may be measured by mean distance between the vertices of a corresponding 3D mesh and the surface of the initial three-dimensional mesh, and the threshold for sufficiently similar may be a mean distance of equal to or less than, e.g., 0.1 mm.

Training the autoencoder enables the first set of latent variables to parametrize a type of object, and allows the latent variables to be decoded back into a sampled matrix, which corresponds to a representation of the underlying object.

An autoencoder by itself, however, only generates output data of the same type as the input data, and does not consider other constraints. For example, an autoencoder to create dental crowns may only generate dental crowns, without considering additional information such as the crown's neighboring teeth. The second step, training an hourglass predictor, allows the incorporation of additional information in generating new objects.

The hourglass predictor keeps the first decoder from the autoencoder, unchanged. However, it uses a second set of training data, where the second set of training input data is of a different but related underlying object as the first set of training data. Although these data sets may not be the same type of object, they may be related to each other, in that each has some information on the other. The training target data has the same type of underlying object as the first set of training input data.

In an embodiment to make dental crowns, the second set of training input data is a set of sampled matrices derived from the dental surroundings of a crown or preparation site, and the training target data is a crown that is fitted to those surroundings. Having one set of data would tell us something about the other set of data, for example, the size of a crown designed for a particular set of surroundings would likely reveal something about the distance between neighboring teeth.

To train the hourglass predictor, the second set of training input data is encoded through a second encoder, to return a second set of latent variables. This second set of latent variables has the same data format as the first set of latent variables. In an embodiment to generate dental crowns, the data format of the sets of latent variables is a vector of scalar numbers. The second set of latent variables is then decoded by the first decoder to return a second set of output data, which has the same type of underlying object as the first set of output data. The second set of output data may at least substantially match the training target data. Note that these steps train the second encoder to return a second set of latent variables that can be decoded into objects of the same type as the first set of output data.

In an embodiment to generate a dental crown, the representation of the surroundings of the crown may be used to train the second encoder to return latent variables that decode into the crown. The training may be complete when the corresponding 3D mesh of the second set of output data was at least substantially the same as the initial three-dimensional mesh of the crowns, by the same measure as described above for the step training the autoencoder.

Once the hourglass predictor is trained, it can be used to generate a third set of output data, of the same type of underlying object as first set of training input data, with a third set of input data of the same type of underlying object as the second set of training data.

For an embodiment generating a dental crown, this means that given a set of dental surroundings, a crown may be generated that predicts what a dental professional would have created for those dental surroundings. The hourglass predictor is flexible in application; as discussed below, it may be trained for different situations, generating different types of objects.

An embodiment further comprises a parametrization of the sampled matrix, wherein the parametrization defines at least one parameter that can represent or manipulate the characteristics of the corresponding 3D mesh of the sampled matrix.

Various embodiments further comprise wherein the at least one parameter comprises one of more of the following: principal components from a principal component analysis; spherical coordinate transformations including rotation, translation, shearing, reflection, scaling, mapping functions; Euclidean transformations comprising rotation, translation, reflection, mapping functions; affine transformations comprising shearing, scaling; spherical harmonics; radial basis functions; and/or any combination thereof.

A parameter can be used to both define and change the object it characterizes. For example, an object might be defined as having a height of 5 mm, but the height could be changed to 10 mm. Objects can be parametrized in Euclidean space, where they may be translated, scaled, rotated, sheared, reflected, mapped, and/or otherwise parametrized by various functions. Three-dimensional objects may also be projected to a sphere, and parametrized through spherical harmonics or radial basis functions. The disclosed sampled matrix may make it easier to apply these parametrizations, thus allowing easy transformations for the corresponding 3D mesh and the underlying object.

Beyond the traditional Euclidean parameters, machine learning methods may allow new and meaningful parameters based on information about the object. Possible parameters from machine learning methods comprise: principal components from principal component analysis, latent variables from autoencoders, coefficients from a regression analysis.

These parameters may allow objects to be changed in new and meaningful ways. For example, a principal component might be used to change the shape of a crown for a better bite, by changing several parts of the tooth at once, as discussed below. If the change is unsuccessful, the value of the parameter can simply be set back to its original value. Parameters also allow for optimization. As the object changes in accordance with the value of the parameter, the parameter can be changed until some aspect is optimized.

An embodiment further comprises generating a transformed 3D mesh, wherein the transformed 3D mesh is generated by changing at least one value of the at least one parameter to transform the corresponding 3D mesh. This allows the corresponding 3D mesh to be a basis for further changes. In one embodiment, the motivation may be to make an existing mesh better fit some criteria.

This transformation may be useful in fitting a model to a second scan, where the scan is faulty, incomplete, and/or otherwise benefits from having a model fitted. For example, a 3D scan of the surface of a tooth is often incomplete, because other teeth and gingiva prevent the entire tooth from being scanned. An embodiment generating a transformed 3D mesh, however, may allow incomplete dental scans to be modelled by transforming existing 3D meshes to fit the surfaces available in the 3D scan, as discussed below.

A further embodiment comprises fitting a 3D model mesh to at least partially match a second scan of a physical object, comprising the steps of:

Selecting an initial model by user choice,

Translating the initial model into the initial three-dimensional mesh, then a corresponding 3D mesh, then a transformed 3D mesh, Using the transformed 3D mesh as the 3D model mesh, where the 3D model mesh is a closer fit to the second scan than the initial three-dimensional mesh.

An initial model is a model that is a basis for further models. Possible initial models include but are not limited to: a physical object, a three-dimensional scan of a physical object, a digital three-dimensional object.

The advantage of an embodiment where an initial model is chosen by the user is that it allows for user preference. For example, a dental professional may have a preferred library model to use in creating a crown. The model can then be translated into the initial three-dimensional mesh, and manipulated based on various parameters.

A closer fitting mesh is a mesh with a better fit compared to another mesh. This fit may be evaluated by the mean distance of vertices to surface, as discussed earlier, and/or evaluated by the measures of fit discussed later.

Another embodiment further comprises selecting a 3D model mesh to at least partially match a second scan, comprising the steps of:

Generating a plurality of initial 3D meshes from a plurality of initial models, wherein each of the plurality of initial 3D meshes is derived from one of the plurality of initial models, Selecting an initial three-dimensional mesh from the plurality of initial 3D meshes that most closely fits the second scan, Translating the initial three-dimensional mesh to a corresponding 3D mesh, and then a transformed mesh, Using the transformed 3D mesh as the 3D model mesh, wherein the 3D model mesh is a closer fit the second scan than the initial three-dimensional mesh.

This embodiment chooses the best fitting model from an existing library, then modifies that model to fit a scan. The advantage of this is a potentially better fit for the scan. Depending on the number of initial models, this embodiment may allow more comparisons than a human would reasonably want to make.

Another embodiment further comprises selecting a 3D model mesh to at least partially match a second scan, comprising the steps of:

Generating a plurality of transformed 3D meshes from at least one corresponding 3D mesh of at least one initial 3D mesh of at least one initial model, Selecting the transformed 3D mesh with the closest fit to the second scan as the 3D model mesh.

Using parameters to create transformed meshes may allow for a variety of meshes to be created. For example, an embodiment with a random distribution may be used to vary the parameters, such that the corresponding 3D mesh of at least one initial model may be used to generate a variety of shapes. By creating a plurality of transformed 3D meshes, a library of existing meshes may be created. Depending on the situation, it may be computationally faster to match to the library of existing meshes, rather than processing, parametrizing, and transforming a three-dimensional mesh.

For example, in an embodiment to create a dental crown, at least one library model, represented as a corresponding 3D mesh, may be used to create a plurality of transformed 3D meshes based on the library model. One of these transformed 3D meshes may provide a more suitable crown than the original at least one library model.

In a further embodiment, the 3D model mesh is used to estimate an unscanned and/or faultily scanned area. Often, getting a complete scan of an object is difficult, due to location, blocking objects, or the shape of the object itself. In such case, having a 3D model mesh to match to the scan allows the underlying object to be modelled regardless, as discussed below.

The 3D model mesh may be used in whole, in part, or in combination with another mesh. In various embodiments, parts of the 3D model mesh are combined with existing meshes, for example, stitching an interproximal area from a 3D model mesh to the actual scan of a tooth. In others, multiple 3D model meshes may be combined, for example, using multiple 3D model meshes of individual teeth to model multiple teeth together. This may be particularly useful in simulating orthodontic treatments, since orthodontic treatments involve moving multiple teeth.

Another embodiment for finding an unscanned area is to use the hourglass predictor directly. In this embodiment, the first set of training input data may be 3D model meshes, the second set of training input data may be second scans, and the training target data may be the 3D model meshes corresponding to the second scans. Thus, the third set of output data may be 3D model meshes from second scans.

An embodiment further comprises estimating an unscanned dental area. The dental area comprises one of more of the following: teeth under brackets and other appliances, subgingival areas, interproximal areas, and/or dentition hidden behind facial features.

In dental scans, a scan may be taken of a patient's teeth and jaw, for example, by using an intraoral scanner on the patient, or by scanning a gypsum model of the patient's oral situation. However, some areas of individual teeth may not be completely scanned, including but not limited to: interproximal areas, where neighboring teeth block the scanner; areas under brackets and other appliances, where the appliance blocks the scanner; subgingival areas, where the gingiva blocks the scanner. For facial scans, dental areas include areas behind facial features, where the lips might block the scanner. In these cases, the partial scan can be matched to a 3D model mesh by one of the methods listed above, using known teeth or library models as the initial model(s).

3D model meshes may be particularly useful in simulating dental and orthodontic treatments. Once each tooth has a 3D model mesh, the dental scan can be manipulated to show what dental and orthodontic changes might look like. For example, in an embodiment, a 3D model mesh of a dental crown may be used with a dental scan to display what the crown will look like once installed. In another embodiment, at least one 3D model mesh may be used to simulate orthodontic treatment. Orthodontic treatment may require that teeth be rotated or otherwise moved, and not all surfaces visible in the treatment may be initially scannable. 3D model meshes for the teeth may be useful in simulating what those surfaces look like when the teeth are rotated or moved.

One embodiment further comprises estimating an unscanned ear area. The ear area comprises one of more of the following: 1st bend, 2nd bend, anterior notch, antihelix, antitragus, concha, ear canal, ear canal including aperture, helix, intertragal notch, and/or tragus.

Ear scans may be difficult to make. The size and curvature of the ear canal limits scanner size and range. Parts of the ear may be blocked by hair, cerumen, and other parts of the ear. Further, ears are not rigid, so the scanner or another object may deform the ear and affect the scan. Thus, it is helpful to have a 3D model mesh of the ear to model what the ear scan should be, even if the original scan is incomplete or otherwise faulty.

By using complete ear scans as initial models or as the first set of input data for an hourglass predictor, a 3D model mesh may be generated for an ear scan. These complete ear scans may come from laboratory scans of ear casts or a set of good scans.

One embodiment further comprises designing a dental restoration, orthodontic appliance, or ear-related device using the transformed 3D mesh, any portion thereof, the 3D model mesh, any portion thereof, the third set of output data from the hourglass encoder, any portion thereof, and/or a combination thereof.

The dental restoration comprises one of more of the following: bridge, denture, crown, implant, implant guide, inlay, onlay, post and core, and/or veneer. The orthodontic appliance comprises one of more of the following: bracket guide, clear aligner, expander, lingual wire, and/or quad helix. The ear-related device comprises one of more of the following: fitted hearing aids, in-ear monitors, and/or noise protection devices.

An embodiment allows three-dimensional objects to be generated, either by transforming an existing object, or creating an object de novo. Existing objects may be scanned or otherwise turned into a mesh, processed through the steps listed above, and then transformed by the parameters. The hourglass predictor allows objects to be generated de novo, based on the third set of input data. The meshes resulting from each of these may be used in whole, in part, and/or in combination.

Three-dimensional objects may include dental restorations, as discussed later. A dental crown, for example, may be created in multiple ways. A library model of a dental crown may be parametrized, then manipulated to fit its surroundings by optimizing the parameters. Different objects can be modified, including the dental restorations, orthodontic appliances, and ear-related devices listed above.

A dental crown may also be generated by using the hourglass predictor, as discussed above. By changing the training data, different types of object may be generated. For example, in an embodiment to generate a veneer, the first set of training input data may be a plurality of veneers and/or teeth as models for veneers, the second set of training input data a plurality of the surroundings for veneers, and the set of training target data the veneers corresponding to those surroundings.

In another embodiment, a fitted hearing aid may be generated. In such case, the first set of training input data may be a plurality of in-ear hearing aids, the second set of training input data a plurality of ear scans, and the set of training target data the in-ear hearing aids corresponding to the ear scans.

An embodiment further comprises output to a data format configured to manufacture a physical object from the corresponding 3D mesh, the transformed mesh, the 3D model mesh, any portion of the preceding meshes, and/or any combination of the preceding.

Once a corresponding 3D mesh or transformed 3D mesh for an object has been generated, the mesh or a portion of it may be translated into a data format suitable for manufacture. In various embodiments, the generated 3D mesh may be a standard file type for 3D objects, including but not limited to: Collaborative Design Activity (COLLADA), Initial Graphics Exchange Specification (IGES), ISO 10303 (STEP), STL, Virtual Reality Modeling Language (VRML).

An embodiment further comprises generating a physical object from the corresponding 3D mesh, the transformed mesh, the 3D model mesh, any portion of the preceding meshes, and/or any combination of the preceding by 3D printing or milling.

The methods described in this disclosure may be applied to the physical world. Milling and 3D printing are methods to turn a 3D mesh or 3D file format into a physical object. Milling is common in dentistry, since it allows durable, well-tested materials to be used. 3D printing is another method of generating physical objects, and one that is rapidly improving. It may allow custom objects to be made with less waste than traditional milling.

In this disclosure, the term "data format" has been used as is commonly used in mathematics and computer science, as the type of format used to store the relevant data. Examples of data formats include: scalars, vectors, vectors of scalar number, matrices, characters, strings, etc.

LIST OF EXAMPLES

A computer-implemented method for generating a corresponding 3D mesh representing a 3D object, the method comprising
  transforming an initial three-dimensional mesh into a planar mesh, the initial three-dimensional mesh comprising a first set of vertices and edges and the planar mesh comprising a second set of vertices and edges, wherein
    each vertex of the second set of vertices is a transformation of a vertex from the first set of vertices and comprises values of the vertex from the first set of vertices, and
    each edge of the second set of edges is a transformation of an edge from the first set of edges and comprises values of the edge from the first set of edges;
  sampling the planar mesh to generate a plurality of samples such that each sample from the plurality of samples comprises
    a three-dimensional coordinate comprising three numerical values representing a point in a three-dimensional space where the three numerical values are derived and/or taken directly from the initial three-dimensional mesh, and
    a coordinate comprising numerical values representing a position of the sample relative to other samples of the plurality of samples;
  generating a sampled matrix based on the plurality of samples; and
  representing the sampled matrix as the corresponding 3D mesh, where the corresponding 3D mesh is a consistently connected mesh, where the consistently connected mesh has a consistent number of neighboring vertices for each vertex, unless said each vertex is on the boundary of the consistent connected mesh.

The method according to example 1, where the corresponding 3D mesh is a triangular mesh.

The method according to any one or more of the preceding examples further comprising moving at least one vertex of the planar mesh based on its distance from a center and/or boundary of the planar mesh.

The method according to any one or more of the preceding examples, where the planar mesh is a unit circle.

The method according to any one or more of the preceding examples, further comprising sampling the planar mesh is based on polar coordinates.

The method according to any one of more of the preceding examples further comprising sampling the planar mesh with an irregular lattice.

The method according to one or more of the preceding examples, where the initial three-dimensional mesh is derived and/or generated from a three-dimensional scan of a physical object.

The method according to one or more of the preceding examples, wherein machine learning is applied to the sampled matrix to generate a transformed 3D mesh and/or derive information from the initial three-dimensional mesh.

The method according to one or more of the preceding examples, where a 3D object is generated or filled in by using the matrix representing a three-dimensional mesh in a computer-implemented method for generating output data, comprising training an autoencoder on a first set of training input data to identify a first set of latent variables and generate first set of output data, where the autoencoder comprises a first encoder, and a first decoder, where the first encoder converts the first set of input data into a first set of latent variables, where the first decoder converts the first set of latent variables to the first set of output data, where the first set of output data is at least substantially the same as the first set of input data;

training an hourglass predictor to return a second set of latent variables, where the hourglass predictor comprises a second encoder and the first decoder, where the second encoder converts a set of training input data to the second set of latent variables, where the second set of latent variables is converted by the first decoder into a second set of output data at least substantially the same as a set of training target data, where the second set of input data is different from the first set of input data; and using the hourglass predictor on a third set of input data to generate a third set of output data, where the third set of output data is the same type of data as the first set of output data.

The method according to one or more of the preceding examples, further comprising a parametrization of the sampled matrix, wherein the parametrization finds at least one parameter that can represent or manipulate the characteristics of the corresponding 3D mesh of the sampled matrix.

The method according to one or more of the preceding examples, further comprising generating a transformed 3D mesh, wherein the transformed 3D mesh is generated by changing at least one value of the at least one parameter to transform the corresponding 3D mesh.

The method according to one or more of the preceding examples, further comprising fitting a 3D model mesh to at least partially match a second scan of a physical object, comprising the steps of:

Selecting an initial model by user choice,
Translating the initial model into the initial 3D model mesh,
Transforming the initial 3D model mesh into a transformed 3D mesh,
Using the transformed 3D mesh as the 3D model mesh, where the 3D model mesh is a closer fit the second scan than the initial 3D model mesh.

The method according to one or more of the preceding examples, further comprising selecting a 3D model mesh to at least partially match a second scan, comprising the steps of:

Generating a plurality of initial 3D model meshes from a plurality of initial models, wherein each of the plurality of initial 3D model meshes is derived from one of the plurality of initial models,
Selecting an initial 3D model mesh from the plurality of initial 3D model meshes that most closely fits the second scan,
Transforming the initial 3D model mesh into a transformed 3D mesh,
Using the transformed 3D mesh as the 3D model mesh, wherein the 3D model mesh is a closer fit the second scan than the initial three-dimensional mesh.

The method according to one or more of the preceding examples, further comprising selecting a 3D model mesh to at least partially match a second scan, comprising the steps of:

Generating a plurality of transformed 3D meshes from at least one initial 3D model mesh of at least one initial model,
Selecting the transformed 3D mesh from the plurality of transformed 3D meshes with the closest fit to the second scan as the 3D model mesh.

The method according to one or more of the preceding examples, where the 3D model mesh is used to estimate an unscanned area and/or faultily scanned area.

The method according to one or more of the preceding examples, wherein the unscanned area is a dental area or an ear area.

The method according to one or more of the preceding examples, further comprising designing a dental restoration, orthodontic appliance, or ear-related device using the transformed 3D mesh, any portion thereof, the 3D model mesh, any portion thereof, and/or a combination thereof.

The method according to one or more of the preceding examples, further comprising output to a data format configured to manufacture a physical object from the corresponding 3D mesh, the transformed mesh, the 3D model mesh, any portion of the preceding meshes, and/or any combination of the preceding.

The method according to one or more of the preceding examples, further comprising generating a physical object from the corresponding 3D mesh, the transformed mesh, the 3D model mesh, any portion of the preceding meshes, and/or any combination of the preceding by 3D printing or milling.

A computer program product in a non-transitory embodied in a non-transitory computer readable medium, where the computer program product includes computer readable program code executable by a hardware data processor to cause the hardware data processor to perform the method of any of the preceding examples when said computer readable program code is executed by the hardware data processor.

BRIEF DESCRIPTION OF THE DRAWINGS

The embodiments of the disclosure, together with its advantages, may be best understood from the following illustrative and non-limiting detailed description taken in conjunction with the accompanying figures in which:

FIG. 1 shows a schematic of a system according to an embodiment of the disclosure;

FIG. 2 shows a method of transforming an initial three-dimensional mesh to a corresponding 3D mesh;

FIG. 3A is a mesh with faces with different numbers of vertices, edges of different lengths, and non-boundary vertices with different numbers of neighboring vertices, according to an embodiment;

FIG. 3B is a mesh with faces with a consistent number of vertices (3), edges of different lengths, and non-boundary vertices with different numbers of neighboring vertices, according to an embodiment;

FIG. 3C is a mesh with faces with a consistent numbers of vertices (4), edges of consistent length, and non-boundary vertices with a consistent number of neighboring vertices (4), according to an embodiment;

FIG. 3D is a mesh with faces with a consistent numbers of vertices (3), edges of consistent length, and non-boundary vertices with a consistent number of neighboring vertices (6), according to an embodiment;

FIG. 4A is a mesh from a 3D scan of the outer surface of a crown, according to an embodiment;

FIG. 4B is a mesh from a 3D scan of a lower jaw with dentition, according to an embodiment;

FIG. 4C is a mesh from a 3D scan of a complete crown, according to an embodiment;

FIG. 4D is a mesh from a 3D scan of an implant guide, according to an embodiment;

FIGS. 5A-5M show an initial three-dimensional mesh and different methods of flattening it to a planar mesh, according to various embodiments;

FIG. 5A is an initial three-dimensional mesh from a 3D scan of the outer surface of a crown, according to an embodiment;

FIG. 5B is the initial three-dimensional mesh 5A flattened to a planar mesh with the shape of a circle, mapped by uniform weights, according to an embodiment;

FIG. 5C is the initial three-dimensional mesh 5A flattened to a planar mesh with the shape of a square, mapped by uniform weights, according to an embodiment;

FIG. 5D is the initial three-dimensional mesh 5A flattened to a planar mesh with the shape of a squircle, mapped by uniform weights, according to an embodiment;

FIG. 5E is the initial three-dimensional mesh 5A flattened to a planar mesh with the original shape of the open surface, mapped by uniform weights, according to an embodiment;

FIG. 5F is the initial three-dimensional mesh 5A flattened to a planar mesh with the shape of a circle, mapped by the weights of the angles of each vertex, according to an embodiment;

FIG. 5G is the initial three-dimensional mesh 5A flattened to a planar mesh with the shape of a square, mapped by the weights of the angles of each vertex, according to an embodiment;

FIG. 5H is the initial three-dimensional mesh 5A flattened to a planar mesh with the shape of a squircle, mapped by the weights of the angles of each vertex, according to an embodiment;

FIG. 5I is the initial three-dimensional mesh 5A flattened to a planar mesh with the original shape of the open surface, mapped by the weights of the angles of each vertex, according to an embodiment;

FIG. 5J is the initial three-dimensional mesh 5A flattened to a planar mesh with the shape of a circle, mapped by the weights of the cotangent of each vertex, according to an embodiment;

FIG. 5K is the initial three-dimensional mesh 5A flattened to a planar mesh with the shape of a square, mapped by the weights of the cotangent of each vertex, according to an embodiment;

FIG. 5L is the initial three-dimensional mesh 5A flattened to a planar mesh with the shape of a squircle, mapped by the weights of the cotangent of each vertex, according to an embodiment;

FIG. 5M is the initial three-dimensional mesh 5A flattened to a planar mesh with the original shape of initial three-dimensional mesh, mapped by the weights of the cotangent of each vertex, according to an embodiment;

FIG. 6A is an initial three-dimensional mesh from a 3D scan of a lower jaw with dentition, according to an embodiment;

FIG. 6B is the initial three-dimensional mesh 6A flattened to a planar mesh with the original shape of the open surface, mapped by the weights of the angles of each vertex, according to an embodiment;

FIG. 6C is an initial three-dimensional mesh from a 3D scan of a crown, according to an embodiment;

FIG. 6D is the initial three-dimensional mesh 6A flattened to a planar mesh with the shape of a triangle, mapped by the weights of the angles of each vertex, according to an embodiment;

FIG. 7A is a mesh that is randomly sampled, according to an embodiment;

FIG. 7B is a mesh that is sampled with a regular grid as the lattice, according to an embodiment;

FIG. 7C is a mesh similar to FIG. 7B, except that the samples are taken along the lattice lines, according to an embodiment;

FIG. 7D is a mesh sampled with a combination of random sampling with lattice sampling, according to an embodiment;

FIG. 7E is a mesh sampled with a lattice that is denser in the center, according to an embodiment;

FIG. 7F is a mesh sampled with a polar lattice that accommodates the circular shape of the planar object, according to an embodiment;

FIG. 8A shows a consistent mesh with four neighbors for each non-boundary vertex and quadrilateral faces, according to an embodiment;

FIG. 8B shows a consistent mesh with six neighbors for each non-boundary vertex, and triangular faces, according to an embodiment;

FIG. 8C shows a consistent mesh where each non-boundary vertex has either four or eight neighbors, and triangular faces, according to an embodiment;

FIG. 8D shows a consistent mesh where each non-boundary vertex has either four or six neighbors, and the faces are triangular or quadrilateral, according to an embodiment;

FIGS. 9A-9C show the correspondence between a 2D RGB matrix, a sampled matrix, and a corresponding 3D mesh, according to an embodiment;

FIG. 9A shows grayscale images of the red, green, and blue matrices respectively, according to an embodiment;

FIG. 9B shows subsets of a sampled matrix, according to an embodiment;

FIG. 9C shows a corresponding 3D mesh to the sampled matrix in FIG. 9B and the images in FIG. 9A, according to an embodiment;

FIGS. 10A-10B show a comparison between a mesh from a three-dimensional scan of a tooth and the corresponding 3D mesh, according to an embodiment;

FIG. 10A shows a three-dimensional scan of a tooth, according to an embodiment;

FIG. 10B shows the scan from FIG. 10A processed into a corresponding 3D mesh, according to an embodiment;

FIG. 11 illustrates a method of generating a corresponding 3D mesh from a scan or a digital object, according to an embodiment;

FIGS. 15A-15F show a corresponding 3D mesh being transformed by different parameters, to better fit a second scan, according to various embodiments;

FIG. 15A shows a second scan 1500 and a corresponding 3D mesh 1501, according to an embodiment;

FIG. 15B shows a transformed 3D mesh from a scalar transformation of the mesh from FIG. 15A, according to an embodiment;

FIG. 15C shows a transformed 3D mesh from a transformation based on one principal component of the mesh in FIG. 15A, according to an embodiment;

FIG. 15D shows a transformed 3D mesh from a transformation based on ten principal components of the mesh in FIG. 15A, according to an embodiment;

FIG. 15E shows a transformed 3D mesh from a transformation based on fifty principal components of the mesh in FIG. 15A, according to an embodiment;

FIG. 15F shows a table of the measures of fit between the second scan and the corresponding 3D mesh of FIG. 15A or the transformed 3D meshes of FIGS. 15B-E, according to various embodiments;

FIGS. 16A-16C show methods of generating a 3D model mesh to match a second scan of an object, according to various embodiments;

FIG. 16A shows an embodiment that generates a 3D model mesh for a second scan by user choice of an initial model and transforming that initial model;

FIG. 16B shows an embodiment that generates a 3D model mesh for a second scan by selecting an initial model from a plurality of models and transforming that initial model;

FIG. 16C shows an embodiment that generates a 3D model mesh for a second scan by transforming at least one initial model into a plurality of initial 3D model meshes, and selecting the best fitting initial 3D model mesh; and FIG. 17 shows embodiments of a method for moving a vertex based on its distance from the center and/or boundary of the planar mesh.

DETAILED DESCRIPTION

Figure 3A:
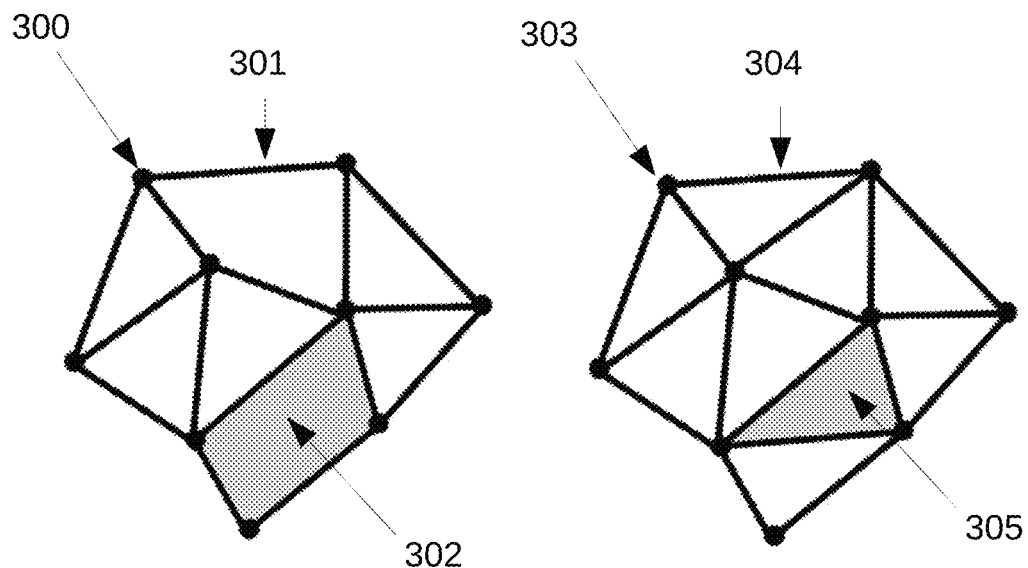
FIGS. 3A-3D show examples of meshes according to various embodiments.

In the following description, reference is made to the accompanying figures, which show by way of illustration how the disclosure may be practiced.

Although some embodiments have been described and shown in detail, the invention is not restricted to them, but may also be embodied in other ways within the scope of the subject matter defined in the following claims. In particular, it is to be understood that other embodiments may be utilized and structural and functional modifications may be made without departing from the scope of the present invention.

In device claims enumerating several means, several of these means can be embodied by one and the same item. The mere fact that certain measures are recited in mutually different dependent claims or described in different embodiments does not indicate that a combination of these measures cannot be used to advantage.

A claim may refer to a method according to one or more of the preceding claims, and "any" is understood to mean "any one or more" of the preceding claims.

The term "obtaining" as used in this specification may refer to physically acquiring for example medical images using a medical imaging device, but it may also refer for example to loading into a computer an image or a digital representation previously acquired.

It should be emphasized that the term "comprises/comprising" when used in this specification is taken to specify the presence of stated features, integers, steps or components but does not preclude the presence or addition of one or more other features, integers, steps, components or groups thereof.

The features of the method described above and in the following may be implemented in software and carried out on a data processing system or other processing means caused by the execution of computer-executable instructions. The instructions may be program code means loaded in a memory, such as a RAM, from a storage medium or from another computer via a computer network. Alternatively, the described features may be implemented by hardwired circuitry instead of software or in combination with software.

FIG. 1 shows a schematic of a system according to an embodiment of the disclosure. The system 100 comprises a computer device 102 comprising a computer readable medium 104 and a microprocessor 103. The system further comprises a visual display unit 107, an input unit such as a computer keyboard 105 and a computer mouse 106 for entering data and activating virtual buttons visualized on the visual display unit 107. The visual display unit 107 may for example be a computer screen.

The computer device 102 is capable of obtaining digital representations, for example, of at least a part of a patient's jaw including the jawbone from e.g. a cone beam computed tomography (CBCT) scanner 101b. The obtained digital representations can be stored in the computer readable medium 104 and provided to the processor 103.

Additionally or alternatively, the computer device 102 is further capable of receiving a digital 3D representation, for example, of the surfaces of the patient's set of teeth and gingiva from an image acquisition device 101a, for example a 3D scanning device, such as the TRIOS intra-oral scanner manufactured by 3shape TRIOS A/S, or capable of receiving scan data from such a 3D scanning device and forming a digital 3D representation of the patient's set of teeth and/or gingiva based on such scan data. The received or formed digital 3D representation can be stored in the computer readable medium 104 and provided to the microprocessor 103.

The system 100 is configured for allowing an operator to design a customized dental restoration using information obtained from the bone scan and/or the surface scan, with limits being set based on pre-determined design criteria. This can be realized for example by displaying the digital representation of the patient's jaw on the visual display unit 107, and the operator can then visualize his/her restoration design on the visual display unit, with respect to the surface of the patient's jaw.

The system comprises a unit 108 for transmitting the digital designs as an output data to a fabrication machine for generating a dental appliance, such as a customized dental restoration to e.g. a computer aided manufacturing (CAM) device 109 for manufacturing the customized dental restorations or to another computer system e.g. located at a milling or printing center where the customized dental restorations are manufactured. The unit for transmitting can be a wired or a wireless connection, and the transmission may be done for example using the internet or File Transfer Protocol (FTP).

The 3D scanning of the patient's set of teeth and/or gingiva using the 3D scanning device 101a, and/or the bone scan using the CBCT scanner 101b can be performed at a dentist while the designing of the customized dental restoration may be performed at a dental laboratory. In such cases the digital 3D representation of the patient's set of teeth and/or the 3D representation of the patient's jaw acquired from the CBCT scanner and/or scanning device can be provided via an internet connection between the dentist and the dental laboratory.

The system 100 as shown is an illustrative example. For example, the computer device 102 may comprise more than one micro processor 103 and/or more than one computer readable medium 104, the visual display unit 107 may be integrated in the computer device 102 or be separate from the computer device 102, etc.

FIG. 2 shows a method of transforming an initial three-dimensional mesh to a corresponding 3D mesh.

A 3D object 200 is represented by initial three-dimensional mesh 202. The initial three-dimensional mesh 202 may be flattened into planar mesh 204, for example by one of the various embodiments in FIGS. 5D-M. The planar mesh 204 may then be sampled for a plurality of samples 206, for example by one of the various embodiments in FIGS. 7A-F. The plurality of samples 206 may be arranged into a sampled matrix 208, an embodiment of which is seen in FIG. 9B. The vertices from sampled matrix 208 may be reconnected into a corresponding 3D mesh 210, for example by one of the various embodiments in FIG. 8.

FIGS. 3A-3D show examples of meshes according to various embodiments. Vertices are represented by dots, for example: 300, 303, 306, 309. Edges are represented by the lines between vertices, for example: 301, 304, 307, 310. Faces are continuous spaces between vertices and edges, for example: 302, 305, 308, 311.

In various embodiments, meshes may differ in several ways. Faces may have a consistent number of vertices, or different numbers of vertices. Edges may be of consistent length, or of different lengths. Non-boundary vertices may have different numbers of neighboring vertices, or a consistent number of neighboring vertices.

FIG. 3A is a mesh with faces with different numbers of vertices, edges of different lengths, and non-boundary vertices with different numbers of neighboring vertices, according to an embodiment.

Figure 3B:
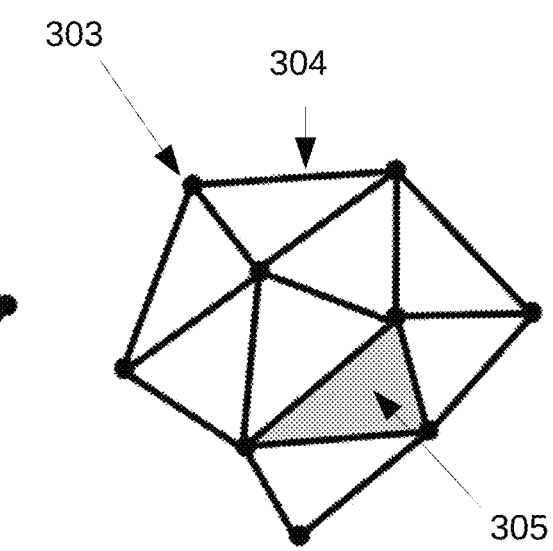

FIG. 3B is a mesh with faces with a consistent number of vertices (3), edges of different lengths, and non-boundary vertices with different numbers of neighboring vertices, according to an embodiment.

Figure 3C:
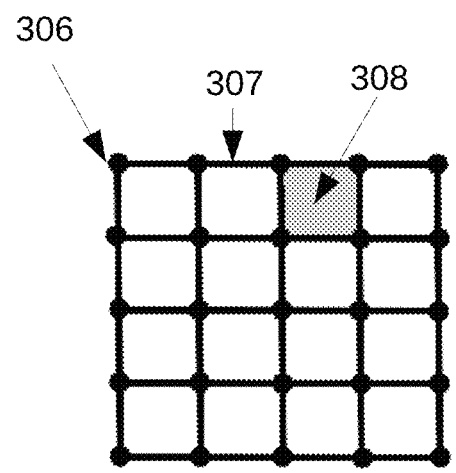

FIG. 3C is a mesh with faces with a consistent numbers of vertices (4), edges of consistent length, and non-boundary vertices with a consistent number of neighboring vertices (4), according to an embodiment.

Figure 3D:
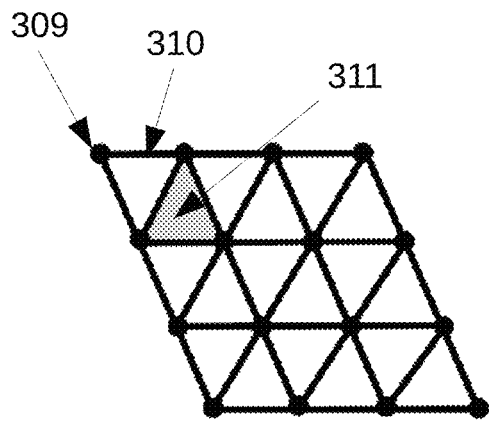

FIG. 3D is a mesh with faces with a consistent numbers of vertices (3), edges of consistent length, and non-boundary vertices with a consistent number of neighboring vertices (6), according to an embodiment.

Different meshes serve different functions, but in representing 3D objects, meshes with triangular faces such as 3B are often used.

FIGS. 4A-4D show examples of what an initial three-dimensional mesh may look like for different objects and surfaces, according to various embodiments.

Figure 4A:
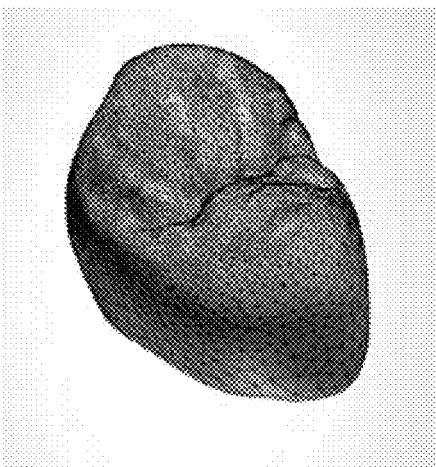
FIGS. 4A-D show examples of what an initial three-dimensional mesh may look like for different objects and surfaces, according to various embodiments.

FIG. 4A is a mesh from a 3D scan of the outer surface of a crown, according to an embodiment. It is an open surface, and can be flattened directly. The boundary of the 3D mesh would be matched to the boundary of the planar object representing it, according to an embodiment.

Figure 4B:
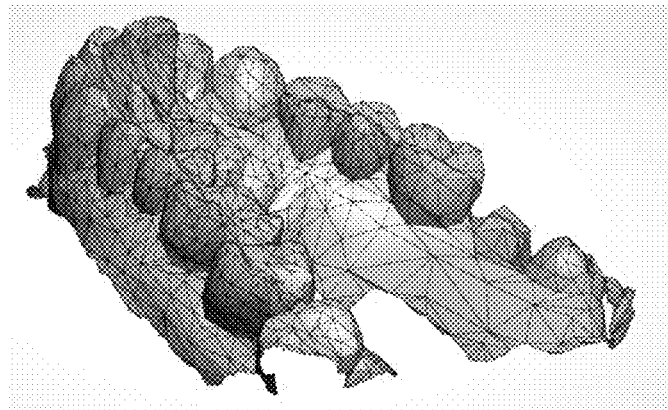

FIG. 4B is a mesh from a 3D scan of a lower jaw with dentition, according to an embodiment. It is an open surface, and can be flattened directly.

Figure 4C:
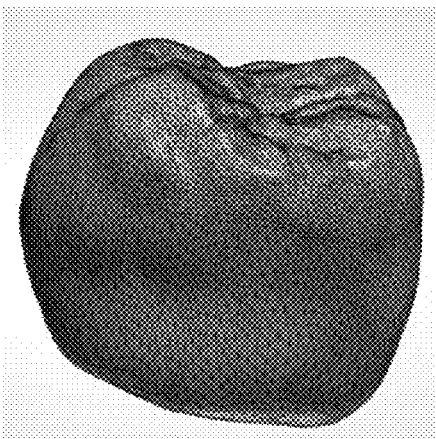

FIG. 4C is a mesh from a 3D scan of a complete crown, according to an embodiment. As a closed surface, it requires that a boundary be set before it can be flattened to a planar mesh.

Figure 6A:
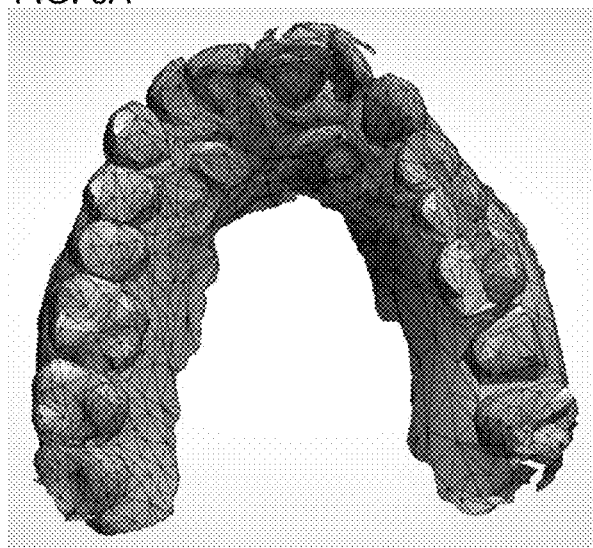
FIGS. 6A-6D show different methods of flattening an initial three-dimensional mesh to a planar mesh, according to various embodiments.
Figure 6B:
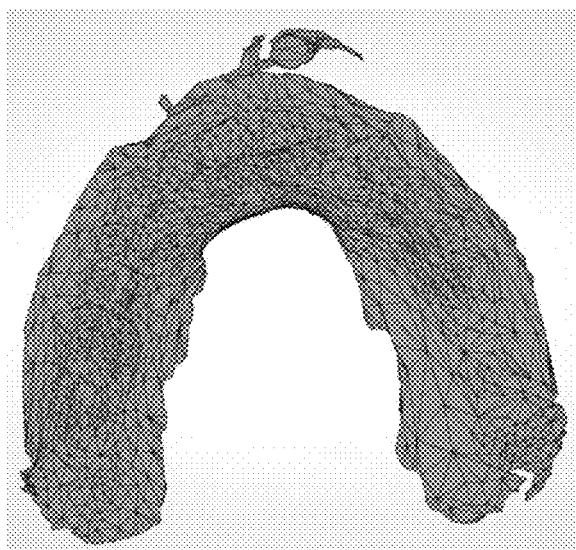
Figure 6C:
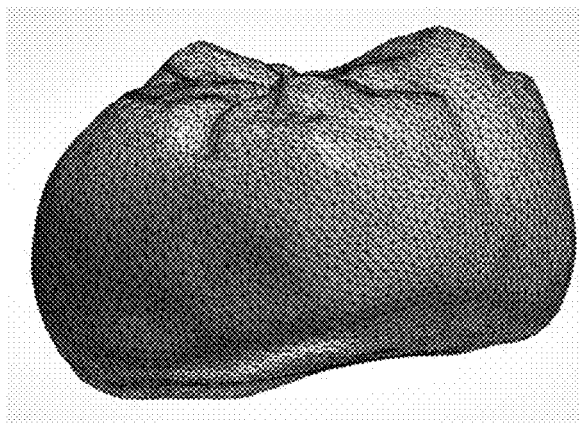
Figure 6D:
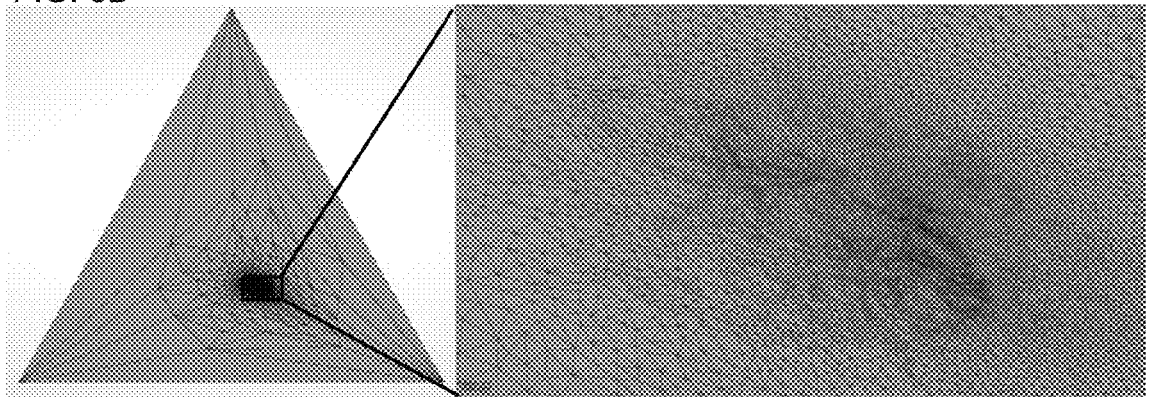

One method of setting the boundary would be to choose a face and set the chosen face as the boundary (See, for example, FIG. 6D). This results in a single planar mesh.

Another would be to set a boundary on some meaningful border such as an anatomical border and/or a geometric border. Potential borders include but are not limited to: the gingival margin, the long axis, along the border between the inner and outer surface of the crown, an intersection of a plane and a 3D object, and/or any orthogonal axes to the previously listed items. This may result in multiple planar meshes, which can be useful for capturing more information about particular areas of the object than a single planar mesh.

Figure 4D:
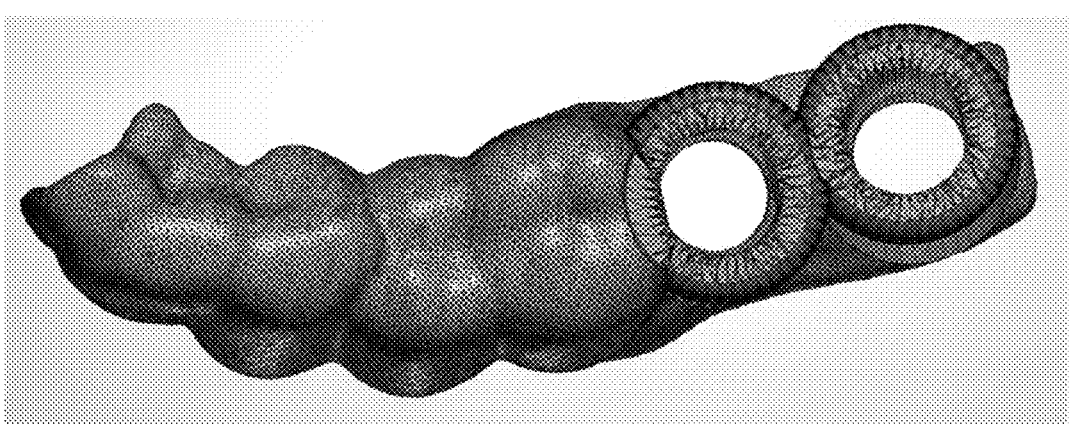

FIG. 4D is a mesh from a 3D scan of an implant guide, according to an embodiment. It is a closed surface, with two holes. Flattening it requires setting a boundary. This may result in multiple planar meshes.

FIGS. 5A-5M show an initial three-dimensional mesh and different methods of flattening it to a planar mesh, according to various embodiments.

FIG. 5A is an initial three-dimensional mesh from a 3D scan of the outer surface of a crown, according to an embodiment. 500 is the view from the top, 501 is the view from an angle, and 502 is the view from the side. Mesh 5A is an open surface.

A boundary of the initial three-dimensional mesh is fixed to the boundary of a planar object. As the initial three-dimensional mesh 5A is an open surface, its own boundary is used in this embodiment. An embodiment may also cut the initial three-dimensional mesh to find a new boundary.

This planar object can be any shape, including but not limited to: circle (for example, FIGS. 5B, 5F, 5J), square (for example, FIGS. 5C, 5G, 5K), squircle (for example, FIGS. 5D, 5H, 5L), the original shape of an open surface (for example, FIGS. 5E, 5I, 5M).

Once the boundaries are fixed, the vertices and edges are flattened to the planar object. There are many methods to flatten the three-dimensional mesh into a planar mesh. In various embodiments, a matrix of each vertex's connectivity to other vertices is created, and solving the system of the matrix maps the coordinates of each vertex to the plane (Tutte 1963). This connectivity may be weighted in different ways, and results in different mappings.

Planar meshes may be mapped based on: uniform weights (Tutte 1963), such as FIGS. 5B-E.

Planar meshes may also be mapped based on the weights of the angles of each vertex (Floater 2016), such as FIGS. 5F-I. This may better preserve the patterns on the mesh.

Planar meshes may also be mapped based on the weights of the cotangent of each vertex (Meyer 2003), such as FIGS. 5J-M. This may better preserve the shape of the triangles in the original mesh.

FIG. 5B is the initial three-dimensional mesh 5A flattened to a planar mesh with the shape of a circle, mapped by uniform weights, according to an embodiment.

FIG. 5C is the initial three-dimensional mesh 5A flattened to a planar mesh with the shape of a square, mapped by uniform weights, according to an embodiment.

FIG. 5D is the initial three-dimensional mesh 5A flattened to a planar mesh with the shape of a squircle, mapped by uniform weights, according to an embodiment.

FIG. 5E is the initial three-dimensional mesh 5A flattened to a planar mesh with the original shape of the open surface, mapped by uniform weights, according to an embodiment.

FIG. 5F is the initial three-dimensional mesh 5A flattened to a planar mesh with the shape of a circle, mapped by the weights of the angles of each vertex, according to an embodiment.

FIG. 5G is the initial three-dimensional mesh 5A flattened to a planar mesh with the shape of a square, mapped by the weights of the angles of each vertex, according to an embodiment.

FIG. 5H is the initial three-dimensional mesh 5A flattened to a planar mesh with the shape of a squircle, mapped by the weights of the angles of each vertex, according to an embodiment.

FIG. 5I is the initial three-dimensional mesh 5A flattened to a planar mesh with the original shape of the open surface, mapped by the weights of the angles of each vertex, according to an embodiment.

FIG. 5J is the initial three-dimensional mesh 5A flattened to a planar mesh with the shape of a circle, mapped by the weights of the cotangent of each vertex, according to an embodiment.

FIG. 5K is the initial three-dimensional mesh 5A flattened to a planar mesh with the shape of a square, mapped by the weights of the cotangent of each vertex, according to an embodiment.

FIG. 5L is the initial three-dimensional mesh 5A flattened to a planar mesh with the shape of a squircle, mapped by the weights of the cotangent of each vertex, according to an embodiment.

FIG. 5M is the initial three-dimensional mesh 5A flattened to a planar mesh with the original shape of initial three-dimensional mesh, mapped by the weights of the cotangent of each vertex, according to an embodiment.

FIGS. 6A-6D show different methods of flattening an initial three-dimensional mesh to a planar mesh, according to various embodiments.

FIG. 6A is an initial three-dimensional mesh from a 3D scan of a lower jaw with dentition, according to an embodiment. Mesh 6A is an open surface.

FIG. 6B is the initial three-dimensional mesh 6A flattened to a planar mesh with the original shape of the open surface, mapped by the weights of the angles of each vertex, according to an embodiment.

FIG. 6C is an initial three-dimensional mesh from a 3D scan of a crown, according to an embodiment. Mesh 6C is a closed surface of genus 0.

FIG. 6D is the initial three-dimensional mesh 6A flattened to a planar mesh with the shape of a triangle, mapped by the weights of the angles of each vertex, according to an embodiment.

To flatten the initial three-dimensional mesh 6C to planar mesh 6D, a boundary of the initial three-dimensional mesh is fixed to the boundary of a planar object. As the initial three-dimensional mesh 6C is a closed surface, a face is selected as the boundary.

This planar object can be any shape. In this embodiment, it is a triangle of the same shape as the face selected as the boundary. As discussed above, once the boundaries are fixed, the vertices and edges are flattened to the planar object, and this may be done with different weights.

FIGS. 7A-7F show examples of methods of sampling the planar mesh, according to various embodiments. Samples are represented by white dots and lattices are represented as black lines. In generating a sampled matrix, however, there may be empty matrix elements where the lattice sample is outside the flattened mesh.

The lattice may include a series of intersecting straight (vertical, horizontal, and angular) and/or curved lines. This may further include equally or unequally spaced lines. The lines may be also equally spaced in some parts and unequally spaced in other parts of the mesh.

By sampling, the dimensionality of the mesh is reduced, and require less processing power for some operations. In the meshes sampled with lattices, the lattices provide the relative location of each sample, making sampled matrices possible. Although circular planar meshes are shown, the sampling methods can be applied to other planar mesh shapes as well.

Figure 7A:
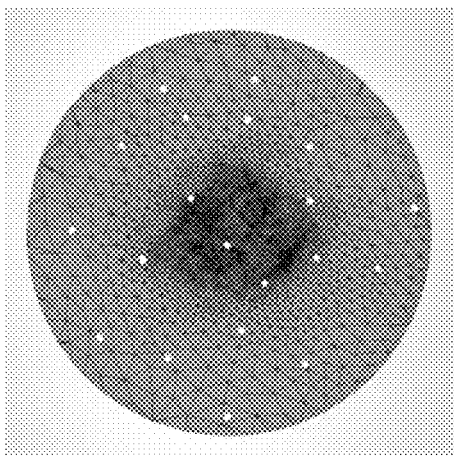
FIGS. 7A-7F show examples of methods of sampling the planar mesh, according to various embodiments.

FIG. 7A is a mesh that is randomly sampled, according to an embodiment. One embodiment uses a two-dimensional Gaussian distribution is used to sample the mesh.

Figure 7B:
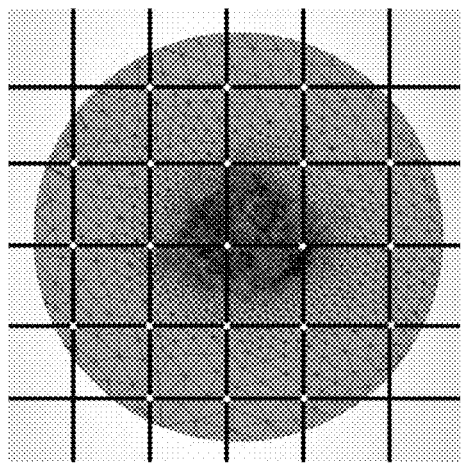

FIG. 7B is a mesh that is sampled with a regular grid as the lattice, according to an embodiment. Here, the samples are taken at the intersections of the grids.

Figure 7C:
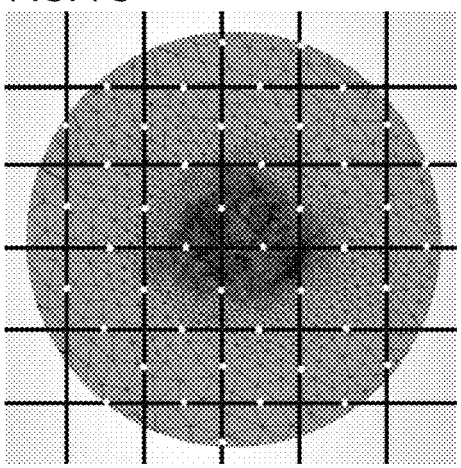

FIG. 7C is a mesh similar to FIG. 7B, with samples are taken from the lattice lines, according to an embodiment.

Figure 7D:
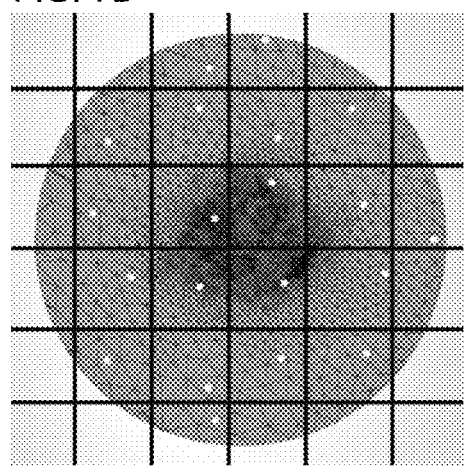

FIG. 7D is a mesh sampled with a combination of random sampling with lattice sampling, according to an embodiment. Here, a random location is chosen from each space between the grid lines. This allows a matrix, while still using an element of randomness.

Figure 7E:
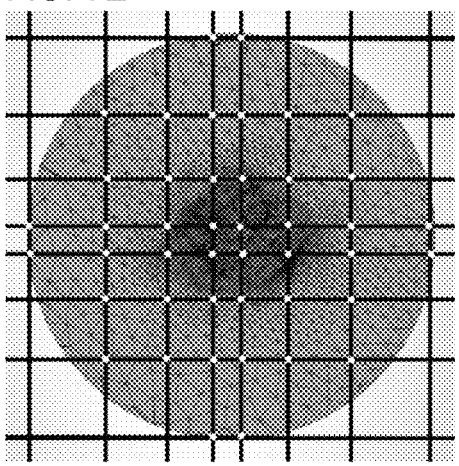

FIG. 7E is a mesh sampled with a lattice that is denser in the center, according to an embodiment. In this mesh, there is more information near the center than the edges. Hence, it makes sense to use a lattice that gathers more samples there. While this embodiment shows samples taken from the intersections of the lattice lines, samples may also be taken from different places on the lines as in mesh 503, or between the lines as in mesh 504.

Figure 7F:
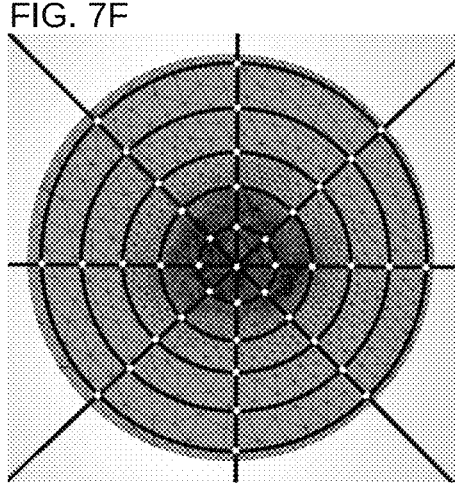

FIG. 7F is a mesh sampled with a polar lattice that accommodates the circular shape of the planar object, according to an embodiment. Further, this lattice also has more samples near the center, where there is more information. While this embodiment shows samples taken from the intersections of the lattice lines, samples may also be taken from different places on the lines as in FIG. 7C or between the lines as in FIG. 7D. The spacing of the concentric grid lines may also be uneven as in FIG. 7E, to accommodate areas that need denser sampling. Although FIG. 7F shows concentric circles, the concentric part of the grid may also be square, squircle, a shape based on the initial three-dimensional mesh, or any other shape.

FIGS. 8A-8D show examples of consistent meshes that can be used to reconnect a mesh based on elements from the sampled matrix, according to various embodiments. For a sampled matrix (see, e.g. FIG. 7), each element includes a point in three-dimensional space. Connecting the points into a consistent mesh preserves the location information of each element of the sampled matrix. Thus, not only can the corresponding 3D mesh be created, the corresponding 3D mesh and the sampled matrix can easily be converted back and forth.

Figure 8A:
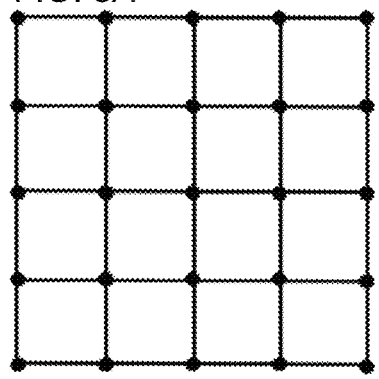
FIGS. 8A-8D show examples of consistent meshes that can be used to reconnect a mesh based on elements from the sampled matrix, according to various embodiments.
Figure 8B:
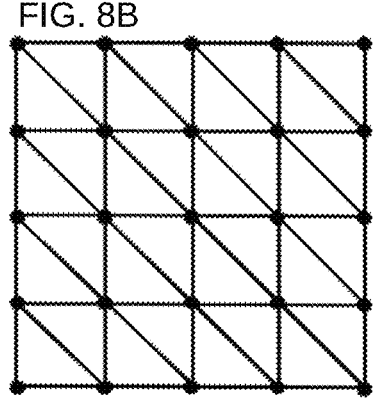

FIG. 8A shows a consistent mesh with four neighbors for each non-boundary vertex and quadrilateral faces, according to an embodiment. FIG. 8B shows a consistent mesh with six neighbors for each non-boundary vertex, and triangular faces, according to an embodiment. Triangular faces allow for a stable reconstruction of a 3D object, and quadrilateral faces are easy divisible into triangular faces.

Figure 8C:
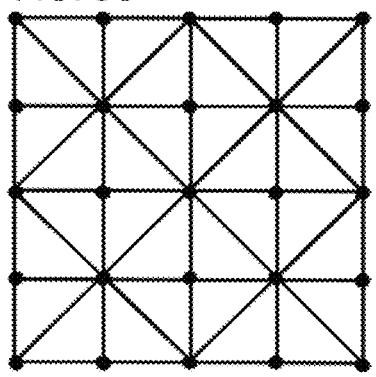
Figure 8D:
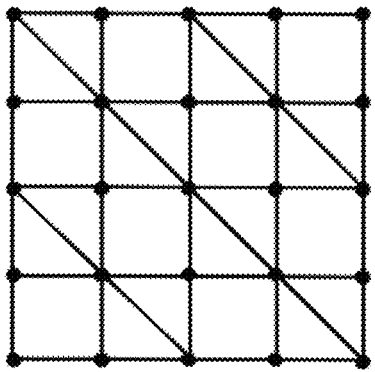

FIGS. 8C-D show that a consistently connected mesh need not have the same number of neighboring vertices. FIG. 8C shows a consistent mesh where each non-boundary vertex has either four or eight neighbors, and triangular faces, according to an embodiment. FIG. 8D shows a consistent mesh where each non-boundary vertex has either four or six neighbors, and the faces are triangular or quadrilateral, according to an embodiment.

FIGS. 9A-9C show the correspondence between a 2D RGB matrix, a sampled matrix, and a corresponding 3D mesh, according to an embodiment.

FIG. 9A shows grayscale images of the red, green, and blue matrices respectively, according to an embodiment. Image 900, the red matrix, represents the x-values of the samples from the planar mesh. Each pixel of the image is equivalent to a matrix cell of the matrix. The x-values have been normalized, and each pixel's scale value is its corresponding sample's normalized x-value. In a similar way, image 901, the green matrix, represents the y-values of the samples of the planar mesh, and image 902, the blue matrix, represents the z-values of the samples of the planar mesh.

The red, green, and blue matrices in FIG. 9A can be combined into a single colored image, the 2D RGB matrix (not displayed, as it would be a color image). The 2D RGB matrix combines the red, green and blue values from FIG. 9A, such that each pixel has an RGB value of the corresponding pixels from each of the matrices in FIG. 9A. A pixel's RGB value thus also corresponds to the three-dimensional coordinate of the pixel's corresponding sample.

FIG. 9B shows subsets of a sampled matrix, according to an embodiment. Specifically, they show rows 55-57, columns 1-3 of the sampled matrices. An entire sampled matrix is not shown due to the limited space available.

A sample from the planar mesh has a location and a three-dimensional coordinate. The location is a coordinate comprising numerical values representing a position of the sample relative to other samples. The three-dimensional coordinate comprising three numerical values representing a point in a three-dimensional space, and may be a Euclidean coordinate.

In the sampled matrices, the sample's location may be the location of its matrix element in the sampled matrix. The three-dimensional coordinate, expressed as x-, y-, and z-values, may be the value of the matrix element. This may be displayed in several ways, as three two-dimensional arrays with elements of one dimension (903-905), or as a two-dimensional array with elements of three dimensions (906).

The sampled matrix represented by 903 is a two-dimensional array with elements of one dimension, the x-dimension. Each matrix element represents a sample, where the matrix element's location is the sample's location, and the matrix element's value is the sample's x-value in absolute coordinates in millimeters. The sampled matrices represented by 904 and 905 are similar to 903, but for y-values and z-values respectively.

The sampled matrix represented by 906 is a two-dimensional array with elements of three dimensions. As can be seen by comparing the first element, a 906 matrix element's value is the value of the matrix elements at the same location in 903-905. Thus, 906 has all three coordinates, x, y, and z.

As the sampled matrix represented 906 and the sampled matrices represented by 903-905 are different data formats of the same object, both formats may be referred to as a "sampled matrix" in this document.

The sampled matrix represented by 903 is analogous to image 900, the red matrix. For a given sample, the x-value may be represented by the 900 matrix element's value as normalized to a value for a red scale or the 903 matrix element's value as a Euclidean coordinate. Euclidean coordinates may be absolute or normalized; the matrices represented by FIG. 9B show absolute coordinates. The sampled matrix subset 903 is for rows 55-57, and columns 1-3, which correspond to the pixels in the same location in the red matrix 900.

In a similar way, the sampled matrices represented by 904 and 905 are analogous to 901 and 902 respectively.

The sampled matrix represented by 906 is analogous to the 2D RGB sampled matrix. For a given sample, the x, y, z value may be represented by the corresponding 2D RGB matrix element's value as normalized to an RGB scale, or the corresponding 906 matrix element's value as a Euclidean coordinate.

FIG. 9C shows a corresponding 3D mesh to the sampled matrix in FIG. 9B and the images in FIG. 9A, according to an embodiment. Note that, unlike a mesh from a scan, the corresponding 3D mesh in FIG. 9C is consistently connected.

A vertex from the corresponding 3D mesh in FIG. 9C has a corresponding matrix element from sampled matrix represented by FIG. 9B; for example, the nine matrix elements shown in FIG. 9B are nine vertices along the left boundary of the tooth. The vertex also has a corresponding pixel in images FIG. 9A, here, the pixels in rows 55-57, columns 1-3.

The RGB matrix/matrices in FIG. 9A, the sampled matrices in FIG. 9B and the corresponding 3D mesh in FIG. 9C are different representations of the same underlying three-dimensional object. Further, these representations are bijective, and can be translated back and forth between formats.

By changing the properties of any one representation, the others can be changed. For example, a matrix operation to change the sampled matrix would change both the 2D RGB matrix and the corresponding 3D mesh. This is especially useful in applying machine learning methods, which rely on matrix operations and/or a uniform data set. The disclosed sampled matrix allows machine learning methods to be performed on three-dimensional objects.

In one embodiment, a scalar transformation may be done by multiplying each element of the matrix by a scalar number; the corresponding 3D mesh would change in size proportionate to the scalar number. In another embodiment, a principal component analysis could be performed on the sampled matrix. Any changes to the sampled matrix based on the principal components would also affect the corresponding 3D mesh.

FIGS. 10A-B show a comparison between a mesh from a three-dimensional scan of a tooth and the corresponding 3D mesh, according to an embodiment. FIG. 10A shows a three-dimensional scan of a tooth and FIG. 10B shows the scan from FIG. 10A processed into a corresponding 3D mesh.

While both the three-dimensional scan in FIG. 10A and the corresponding 3D mesh in FIG. 10B cover the tooth, the corresponding 3D mesh has a consistently-connected mesh and more evenly-distributed vertices. This is particularly visible when comparing close ups, where the close up of the three-dimensional scan in FIG. 10A has a higher density of vertices around the ridges of the tooth, while the close up of the corresponding 3D mesh in FIG. 10B covers the same area with fewer vertices. Compared to the three-dimensional scan in FIG. 10A, the corresponding 3D mesh in FIG. 10B allows faster analyses while maintaining the quality of those analyses, since it conveys the same underlying information about the object with fewer data points.

FIG. 11 illustrates a method of generating a corresponding 3D mesh from a scan or a digital object, according to an embodiment. In 1101, a scan is taken of a physical object, here, the surface of a tooth or crown. This step is optional, as some objects exist solely as digital objects. A model may have been designed in a CAD/CAM program and never have been a physical object. 1102 shows an initial 3D mesh from the scan.

From 1102 to 1103, the initial 3D mesh is flattened to a planar mesh, through the mesh flattening procedure described above. At this point, the initial 3D mesh and the planar mesh are bijective. For some mesh flattening procedures, the flattening process may be entirely reversible. Step 1104 shows the planar mesh being sampled, although, as discussed above, there are several methods to do this. Step 1105 shows the sampled matrix, where each element represents a sample from the planar mesh.

Step 1106 shows the corresponding 3D mesh to the sampled matrix according to an embodiment. Here, the corresponding mesh is a consistent mesh and the sampled matrix and corresponding 3D mesh can be translated back and forth. Further, an operation on either can be translated back to the other. For example, a matrix operation on the sampled matrix can translate to the corresponding 3D mesh. Conversely, a change of the shape of the corresponding 3D mesh in 1105 can change the sampled matrix as well.

Figure 12:
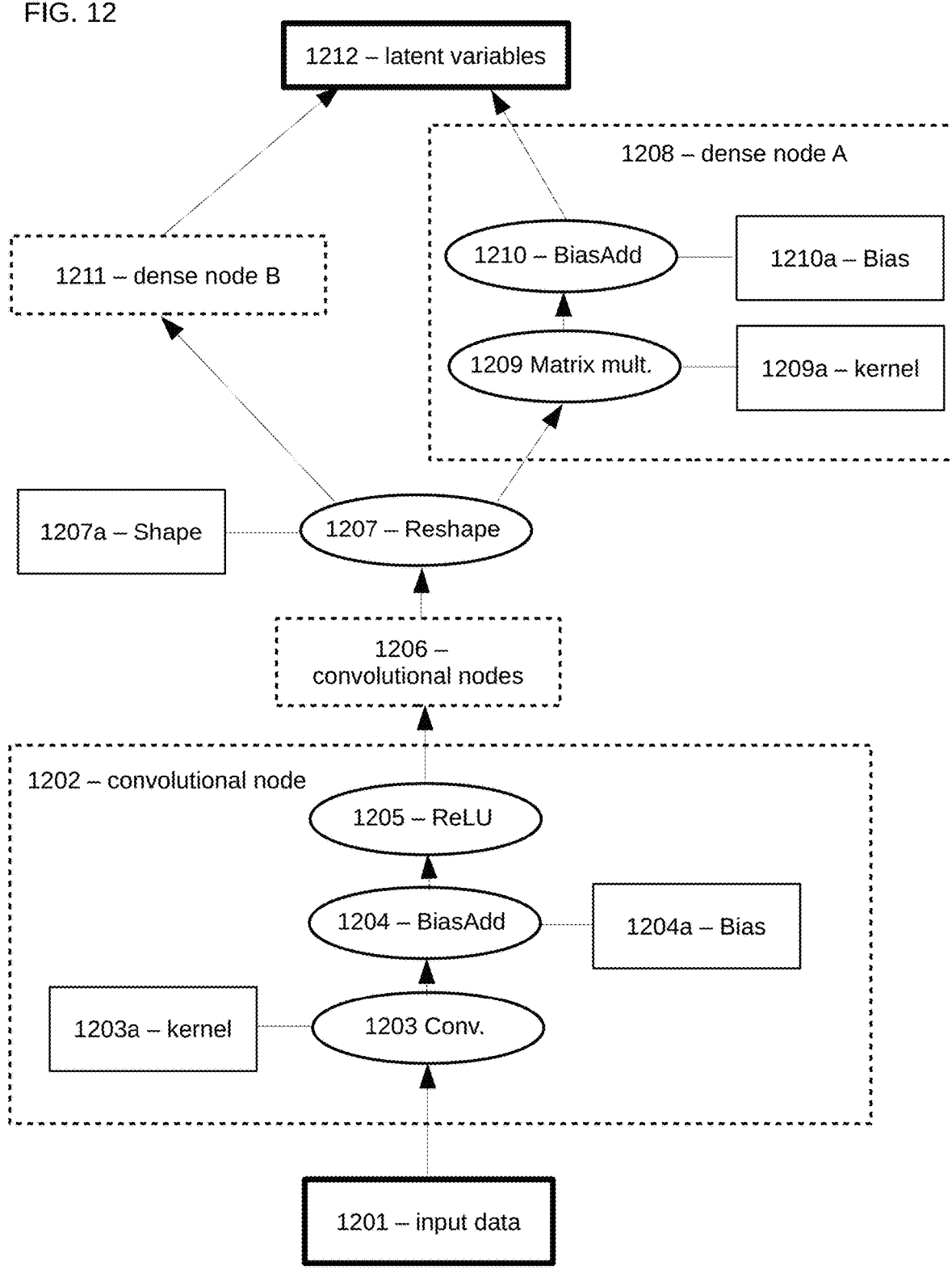
FIG. 12 shows an example architecture of a suitable convolutional neural network, according to an embodiment.

FIG. 12 shows an example architecture of a suitable convolutional neural network, according to an embodiment. This particular convolutional neural network may be used as an encoder. FIG. 12 is based off a tensorflow graph, commonly used to diagram neural networks.

The input data 1201 is processed by a convolutional node 1202. In this embodiment, the input data may be the sampled matrices of various crowns and/or teeth.

The convolutional node 1202 may be comprised of a series of steps, for example: convolution 1203, bias add 1204, rectified linear unit 1205.

Convolution 1203 convolves the input data 1201 with kernel 1203a. Kernel 1203a is a series of filters. Kernel 1203a is a learnable parameter changed by backpropagation. The filters may be of any size of at least 2 by 2, but preferably size 4 by 4. There is at least one filter, but preferably a range of 16 to 512, and for this first convolution, more preferably 64. The filters may be randomly initialized. Convolution 1203 uses strides of at least one, but preferably at least 2.

Convolution 1203 outputs filter activations of the input data 1201, which are then input into BiasAdd operation 1204.

BiasAdd operation 1204 takes the output of Convolution 1203 and adds the bias 1204a to each element. Bias 1204a is a set of scalar numbers. Bias 1204a is a learnable parameter changed by backpropagation. Bias 1204a may be randomly initialized or may be initialized at all zeros. BiasAdd operation 1204 is optional for the convolutional node, but may be helpful in optimizing prediction results, depending on the embodiment.

The output of convolution 1203 or the output of biasAdd operation 1204 is then input into rectified linear unit (ReLU) 1205. ReLU 1205 is an activation function, which sets the input to zero if the input is negative, but does not change the input otherwise. Rectified linear units are a popular activation function, but other activation functions may be used, and include but are not limited to: sigmoid functions, hyperbolic tangents.

The output of ReLU 1205 is a set of filter activation matrices, which may then be input into another convolutional node. Convolutional nodes 1206 are a series of convolutional nodes of the same format as convolutional node 1202, although their filter size, number of filters, filter initializations, stride size, biases, and activation functions may vary. Although convolutional node 1202 may be sufficient for an embodiment of the network, more convolutional nodes are preferred. Thus, convolutional nodes 1206 may be 1-24 convolutional nodes, preferably 4 convolutional nodes.

Reshape 1207 takes the output of the final convolutional node of convolutional nodes 1206 and changes the format with shape 1207a. In this embodiment, shape 1207a flattens each filter activation matrix from the output to a vector of scalar numbers. Flattening is necessary in this embodiment, as the next step is a dense node that requires a vector.

However, other embodiments may use a different shape, depending on what input data format the next step requires.

The output vectors of Reshape 1207 are then input into two dense nodes, a dense node A 1208 and a dense node B 1211. Here, two dense nodes are used, because a variational autoencoder may require both means and standard deviations or logarithms of variance. However, another embodiment may use only one dense node or more than two dense nodes, to output latent variables directly.

Dense node A 1208 may be comprised of a series of steps, for example: matrix multiplication 1209, Bias add operation 1210. Dense node A 1208 may output standard deviations or logarithms of variance.

Matrix multiplication 1209 multiplies its input data by a kernel 1209a. Kernel 1209a is a matrix of weights, which may be initialized randomly. Kernel 1209a is a learnable parameter changed by backpropagation.

The output of matrix multiplication 1209 is then input into bias add operation 1210. Bias add operation 1210 adds bias 1210a to each element of the input. Bias 1210a is a set of scalar numbers and a learnable parameter changed by backpropagation, and may be randomly initialized or may be initialized at all zeros.

Dense node B 1211 has a similar format to dense node A 1208, and may output means.

The output of dense nodes 1208 and 1211 is sampled to generate the latent variables 1212. Although this embodiment of the disclosure uses two dense nodes, a single dense node may also be used to directly generate the latent variables 1212.

These latent variables are then fed into a decoder, not pictured, which may be a similar neural network, but with deconvolutions rather than convolutions. The entire encoder-decoder structure is trained, backpropagating different weights to the various learnable parameters throughout the structure.

Figure 13:
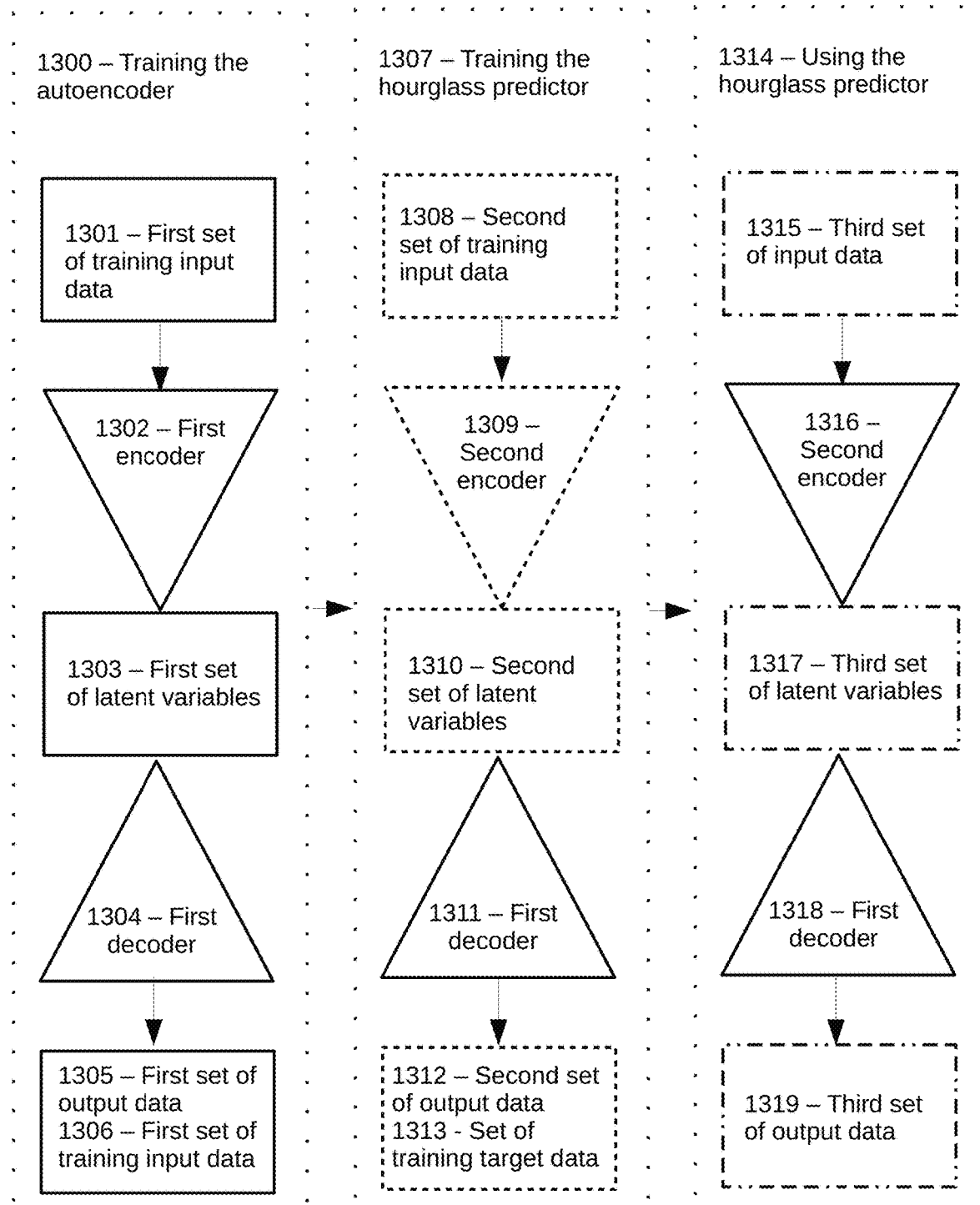
FIG. 13 shows the method of creating an hourglass predictor, according to an embodiment.

FIG. 13 shows a method of creating an hourglass predictor, according to an embodiment. The hourglass predictor predicts what an object should be based on different but related data.

The first step is 1300, training an autoencoder. In one embodiment, the first set of input training data 1301 is the sampled matrix. The first encoder 1302 encodes the first set of input training data 1301 into a first set of latent variables 1303. In one embodiment, the first encoder 1302 is a neural network, for example, a convolutional neural network or a dense neural network.

The first set of latent variables 1303 may have, for example, 3-50 latent variables in one embodiment, although there may be more or fewer latent variables. Latent variables can act as a parametrization of the tooth themselves, both for embodying the object, and for transforming the object. The latent variables are scalar numbers in one embodiment.

In one embodiment, the first decoder 1304 is a neural network, including but not limited to: convolutional neural networks, dense neural networks. The first decoder 1304 decodes the first set of latent variables 1303 into a first set of output data 1305. The first set of output data 1305 has the same data format as the first set of training input data 1301. In one embodiment, both 1301 and 1305 are sampled matrices.

A neural network is trained on target data, and the similarity between the output data and the target data determines what weights to assign to the neurons. Measuring the similarity between target data and output data depends on the application. One example, measures of fit between two meshes, is discussed below. In an autoencoder, the training target data is the input data itself. Hence, the target data for the first set of output data 1305 is the first set of training input data 1306. The autoencoder is trained once the first set of output data 1305 at least substantially matches the target data, i.e. the first set of training input data 1301/1306. The specific measure used to determine a substantial match depends on what the hourglass predictor is used for, but an example is given in FIG. 14.

The second step is 1307, training an hourglass predictor. The second set of input data 1308 has different underlying objects than the first set of input data. However, there should be some underlying connection between the first set of input data and the second set of input data. The data format of the second set of input data 1308 may also be different from the first set of input data 1301. Examples of underlying objects are in FIG. 14.

The second encoder 1309 encodes the second set of input training data 1308 into a second set of latent variables 1310. In one embodiment, the second encoder 1309 is a neural network, for example, a convolutional neural network or a dense neural network. The second set of latent variables 1310 must be of the same data format as the first set of latent variables 1303, including having the same number of latent variables and the same data type. However, because they come from a different set of data, they will have different values for the latent variables.

The first decoder 1311 is identical to the first decoder 1304 of the first step, and decodes the second set of latent variables 1310 into the second set of output data 1312. Because the first decoder 1304/1311 is used here, the second set of output data 1312 has the same type of underlying object and the same data format as the first set of output data.

The set of target training data are generally of the same type of underlying object as the first set of training input data. The underlying objects represented in the training data sets are generally similar enough that they can be parametrized by the same set of latent variables, although they need not be identical. For example, outer surfaces of crowns and partial surfaces of teeth may be similar enough to be parametrized by the same set of latent variables, but are not identical underlying objects.

In training the hourglass predictor, each element of the set of target training data is matched to an element in the second set of training input data. The second set of output data 1312 at least substantially matches the training target data 1313, and the second encoder may be weighted accordingly. Once the second set of output data 1312 at least substantially matches the training target data 1313, the hourglass predictor is trained. The exact measure for this match, as discussed above, depends on the application the hourglass predictor is used for.

The third step is 1314, using the hourglass predictor. A third set of input data 1315 and the second set of input data 1308 have the same underlying object and the same data format. The second encoder 1316 is identical to the second encoder 1309 of the second step, and encodes the third set of input data 1315 into a third set of latent variables 1317.

The third set of latent variables 1317 has the same data format as the first and second sets of latent variables 1303 and 1310.

The first decoder 1318 is identical to the first decoder 1304 and 1311 of the first and second steps, and decodes the third set of latent variables 1317 into the third set of output data 1319. Because the first decoder 1304/1311 is used here, the third set of output data 1319 has the same type of underlying object and the same data format as the first and second sets of output data 1305 and 1312.

The third set of output data 1319 is a prediction of what the underlying object should be based on the third set of input data 1315.

Figure 14:
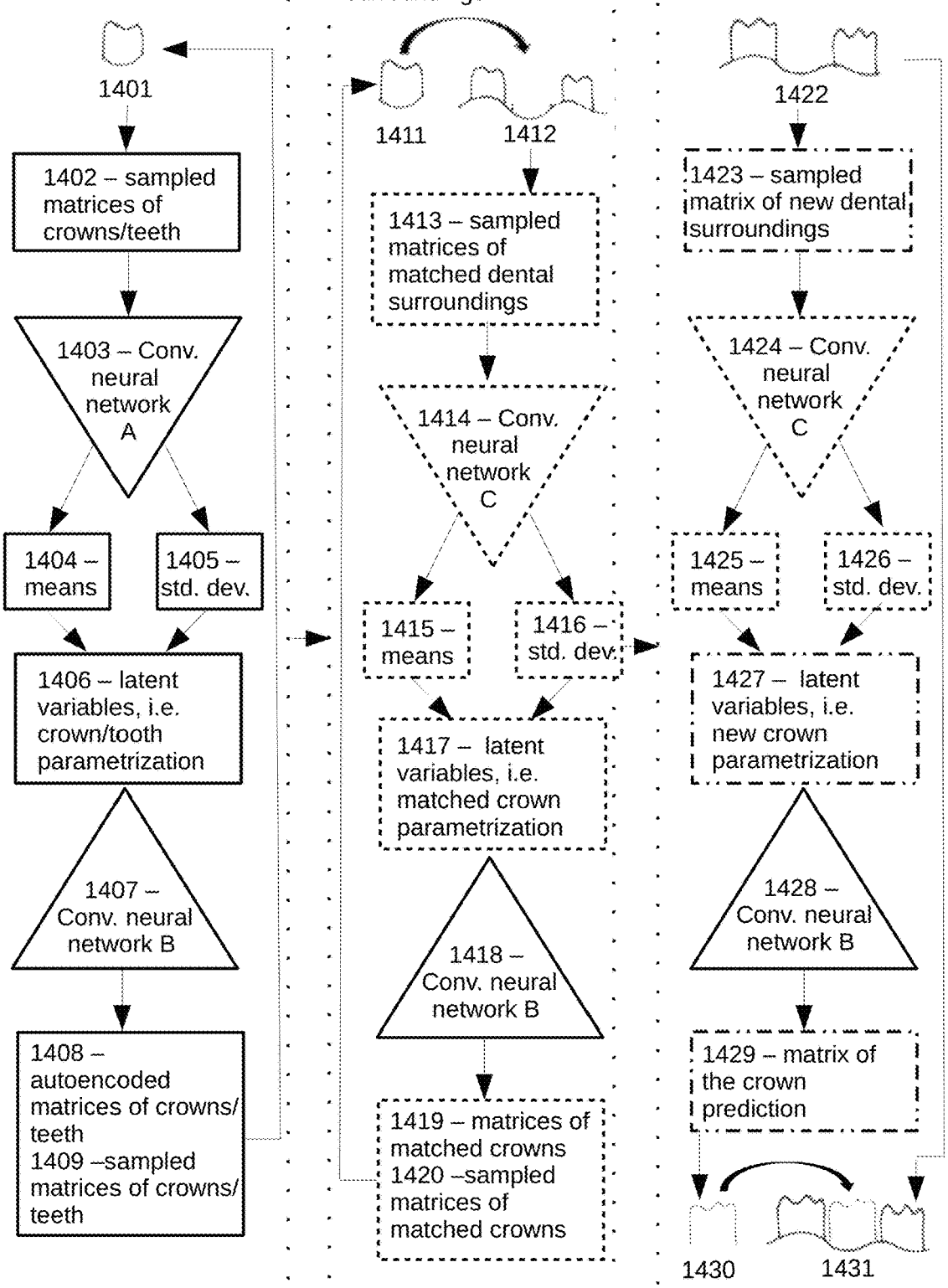
FIG. 14 shows the hourglass predictor generating a dental crown, according to an embodiment.

FIG. 14 shows the hourglass predictor generating a dental crown, according to an embodiment. In this embodiment, the hourglass predictor is trained to predict the outer surface of a dental crown given dental surroundings. The outer surface may be connected to a mesh of a bottom surface appropriate for further manufacture and/or the preparation. For FIG. 14, the term "crown" may be used as shorthand for the outer surface of a crown, in regards to objects 1402, 1408, 1409, 1419, 1420, 1429, and 1430.

The first step 1400 training an autoencoder to parametrize/output crowns. For the method of this embodiment, the autoencoder gives us a set of latent variables to parametrize the crown and a decoder to decode the latent variables back into a crown. In this embodiment, the autoencoder may be a variational autoencoder, which uses a probability distribution to generate latent variables rather than generating them directly (Goodfellow, Ian, et al. *Deep learning*. Vol. 1. Cambridge: MIT press, 2016, Chapter 14). An embodiment may also be an ordinary autoencoder, which generates latent variables directly. The advantage of a variational autoencoder is that using the probability distribution allows better inferences where data is sparse.

Tooth 1401 is one example of the type of underlying object represented by the input training data 1402, the target training data 1409, and the output data 1408. A plurality of teeth and/or crowns are processed into sampled matrices per the method described in FIG. 9.

Sampled matrices of a plurality of crowns and/or teeth 1402 are the first set of input training data. As the hourglass predictor is here being used only to generate the outer surface of a crown, both crowns and actual teeth may be used as training data. The sampled matrices of a plurality of crowns 1402 may be based on scans of physical crowns and/or teeth, or digital objects representing crowns and/or teeth.

Convolutional neural network A (1403) encodes the sampled matrices of a plurality of crowns 1402 into a means vector 1404 and a standard deviations vector 1405. Vector 1405 may alternatively be a vector of a logarithm of the variance. The means vector 1404 and standard deviations vector 1405 are then sampled to estimate latent variables, i.e. crown and/or tooth parametrization 1406. An example of this convolutional neural network is further detailed in FIG. 10.

The latent variables, i.e. crown and/or tooth parametrization 1406 can parametrize a tooth, and can be decoded back into a sampled matrix, with a corresponding 3D mesh for that tooth. The data format of these latent variables is a set of scalar numbers. There may be 3-50 scalar numbers, although the total number of set members should stay consistent for a given hourglass predictor.

The latent variables are a parametrization of the tooth, and allow the shape of the tooth to be represented by a set of scalar numbers. These numbers are not easily interpreted by human perception, but do contain information about the shape of the tooth as discovered by the machine learning method. Further, these numbers can be translated back into a corresponding 3D mesh of the underlying tooth.

As parametrizations, the latent variables can also be used to change the tooth. Changing the value of a latent variable comes with a corresponding change to the shape of the corresponding 3D mesh of the tooth. This allows for the precise quantification of change.

Convolutional neural network B (1407) decodes the latent variables, i.e. crown and/or tooth parametrization 1406 into autoencoded matrices of crowns/teeth 1408. The autoencoded matrices of crowns/teeth 1408 are equivalent to the first set of output data 1305 in FIG. 13.

Convolutional neural networks use backpropagation for training, based on comparing output data to target data. Autoencoders are a special arrangement where the input data is itself the target data. Thus, the output data of convolutional neural network B (1407), the autoencoded matrices of crowns/teeth 1408, is evaluated based on its similarity to the sampled matrices of crowns/teeth 1403/1409.

The second step 1410 trains the hourglass predictor to create crowns based on their surroundings. This step gives us an encoder to encode a different, but related set of input data into the latent variables. The latent variables can then be decoded back into the underlying object of the autoencoder. In this embodiment, the input data is a representation of the surroundings of a dental crown, and the output data is a representation of a dental crown.

The matched crown and surroundings 1411 and 1412 are examples of the underlying objects of the training data set for the hourglass predictor. The surroundings 1412 are the collection of objects around the crown or the preparation for the crown, including but not limited to: neighboring teeth, antagonist teeth, gingiva, jaw, and/or preparations. The crown 1411 is an existing crown designed for the surroundings 1412, for example, by a dental technician.

The surroundings 1412 are the underlying object for the input training data 1413, and the crown 1411 is the underlying object for the output data 1419 and target training data 1420. A plurality of these are processed into a sampled matrix per the method described in FIG. 11.

Sampled matrices of matched dental surroundings 1413 are the second set of input training data. The sampled matrices of matched dental surroundings 1413 are based on dental surroundings like 1412 (See FIG. 11 for the method of obtaining a sampled matrix from a three-dimensional object).

Convolutional neural network C (1414) encodes the sampled matrices of matched dental surroundings 1413 into a means vector 1415 and a standard deviations vector 1416. The means vector 1415 and standard deviations vector 1416 are then sampled to estimate latent variables, i.e. matched crown/tooth parametrization 1417. An example of a convolutional neural network is further detailed in FIG. 10.

The latent variables, i.e. matched crown parametrization 1417, are of the same data format as the latent variables from the first step 1406, and represent the same underlying objects.

Convolutional neural network B (1418) decodes the latent variables, i.e. matched crown parametrization 1417 into matrices of matched crowns 1419. Convolutional neural network B (1418) is identical to convolutional neural network B from the first step (1407). Using convolutional neural network B (1407/1418) as decoder for both steps means that the latent variables are decoded into the same type of object, here the outer surface of a crown.

The matrices of matched crowns 1419 are equivalent to the second set of output data 1312 in FIG. 13. This output data is evaluated in comparison to the set of target training data, sampled matrices of matched crowns 1420.

Each of the sampled matrices of matched crowns 1420 corresponds to a sampled matrix of matched dental surroundings from 1413. The decoder, convolutional neural network B (1407/1418) is not changed, meaning that a given set of latent variables always returns the same output. Thus, only the encoder, convolutional neural network C (1414) is trained in step 1410.

In sum, step 1410 trains convolutional neural network C (1414) to return latent variables (1417) that will decode to crowns that match the given surroundings.

The third step 1421 predicts a crown for new surroundings. The hourglass predictor, trained in the previous step, is used on a new set of dental surroundings to generate a crown. The generated crown is a prediction based on the training data from the previous step, and can be thought of as what a dental professional would have designed, given the surroundings.

New surroundings 1422 are one example of the underlying object of the input data for the hourglass predictor. This is the same type of underlying object as the matched surroundings 1412. The new surroundings 1422 are processed into a sampled matrix 1423 per the method in FIG. 9. The sampled matrix 1423 is equivalent to the third set of input data 1315 in FIG. 13.

Convolutional neural network C (1424) encodes the sampled matrix of new dental surroundings 1423 into a means vector 1425 and a standard deviations vector 1426. The means vector 1425 and standard deviations vector 1426 are then samples to estimate latent variables, i.e. matched crown/tooth parametrization 1427. Convolutional neural network C (1424) is identical to convolutional neural network C (1414) from step 1410.

The latent variables, i.e. new crown parametrization 1427, are of the same data format as the latent variables from the first step (1406) and second step (1416), and represent the same underlying objects.

Convolutional neural network B (1428) decodes the latent variables, i.e. new crown parametrization 1427 into a sampled matrix of the crown prediction 1429. Convolutional neural network B (1428) is identical to convolutional neural network B from the first and second steps (1407/1418).

The matrix of the crown prediction 1429 is equivalent to the third set of output data 1319 in FIG. 13. Note that there is no training in step 1421, so there is no target data, and no backpropagation.

The matrix of the crown prediction 1429 can now be used to generate a physical crown 1430. The matrix of the crown prediction 1429 is reconnected into a mesh such as found in FIG. 6, and this mesh is connected to a mesh of a bottom surface appropriate for further manufacture and/or the preparation. If necessary, the mesh is converted a data format configured to manufacture a physical object, which is then used to mill, 3D print, or otherwise make the physical crown 1430.

The physical crown 1430 can be placed in the new surroundings 1422, resulting in the new surroundings with crown 1431.

FIGS. 15A-15F show a corresponding 3D mesh being transformed by different parameters, to better fit a second scan, according to various embodiments.

Figure 15A:
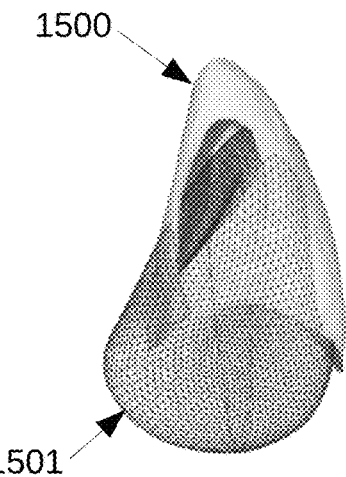

FIG. 15A shows a second scan 1500 and a corresponding 3D mesh 1501, according to an embodiment.

In this embodiment, the second scan (1500, 1502, 1504, 1506, 1508) is a partial scan of an incisor. A typical incisor scan from a dental patient is incomplete—here, the interproximal and subgingival surfaces are missing due to neighboring teeth and gingiva, respectively. For applications such as treatment simulations, a more complete model of the tooth is needed. Although the second scan 1500 is shown as a faceted gray scale surface here, to visually distinguish it from initial corresponding 3D mesh 1501, it is also a mesh.

The corresponding 3D mesh 1501 is a 3D mesh of an average incisor. The corresponding 3D mesh can be a model based on user choice, or chosen from a plurality of models, as demonstrated in FIG. 16 below. It has interproximal and subgingival surfaces, and part of the tooth root as well. However, it generally needs to be fitted to the scan.

Different methods may be used to measure the fit between the second scan (1500, 1502, 1504, 1506, 1508) and a 3D model mesh (1501) or a transformed 3D mesh (1503, 1505, 1507, 1509). The embodiments described below use the distances between the meshes—For each vertex on a first mesh, the distance to the closest point on the surface of the second mesh is measured.

The larger mesh may also be cut to fit the smaller one, so that only close points are compared.

One measure of fit is the summed distances. This is simply the sum of all distances.

Another measure of fit is the 95th percentile distance. All distances are ordered, and the distance at the 95th percentile is the measure of fit.

Another measure of fit is the weighted average distance. The distance for each vertex is weighted by the surface area of the faces touching that vertex. The average of the weighted distances is the measure of fit.

For the above measures of fit, a smaller value is a closer fit. For the summed distances, this assumes a comparable number of vertices.

Figure 15B:
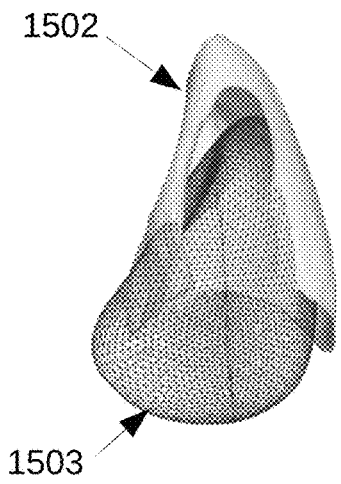
Figure 15C:
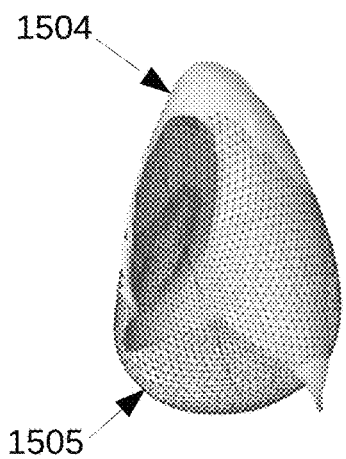
Figure 15D:
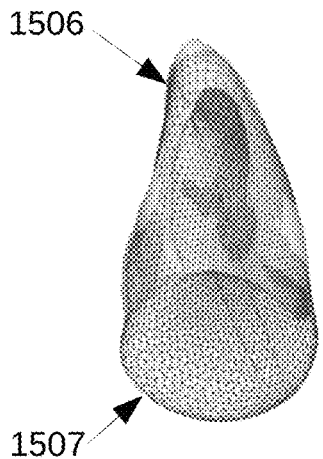
Figure 15E:
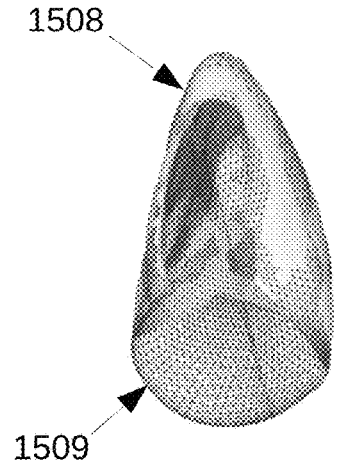

Fitting the corresponding 3D mesh 1501 to the second scan 1500 may be done by changing parameters. FIG. 15B shows the traditional Euclidean parameters of scale. FIGS. 15C-E show parametrization and optimization through PCA, which is possible only through a uniform data format like the sampled matrix, as discussed above. The table in FIG. 15F lists the measures of fit between the second scan and each corresponding 3D mesh or transformed 3D mesh.

FIG. 15B shows a transformed 3D mesh from a scalar transformation of the mesh from FIG. 15A, according to an embodiment. The transformed 3D mesh 1503 is the corresponding 3D mesh 1501, scaled up 10%. Although the fit improves, it is clear that scalar transformations alone cannot change the shape of the corresponding 3D mesh 1501 to fit the contours of second scan 1500/1502.

FIG. 15C shows a transformed 3D mesh from a transformation based on one principal component of the mesh in FIG. 15A, according to an embodiment. The transformed 3D mesh 1505 is the corresponding 3D mesh 1501, with one principal component calculated and optimized. The table in FIG. 15F shows improved fit across all measures, especially in comparison to the scalar transformation from FIG. 15B.

Unlike the traditional Euclidean transformations, this transformation is applied non-uniformly across the entire 3D mesh model. It affects some areas more than others. For example, the cusp of transformed 3D mesh 1505 follows the cusp of second scan 1500/1502/1504 much more closely than either 1501 or 1503. This change is not random; rather, it is a translation of a meaningful variable from a higher dimensional space.

FIG. 15D shows a transformed 3D mesh from a transformation based on ten principal components of the mesh in FIG. 15A, according to an embodiment. The transformed 3D mesh 1507 is the corresponding 3D mesh 1501, with ten principal components calculated and optimized. The table in FIG. 15F shows improved fit across all measures over the transformation based on one principal component 1505.

FIG. 15E shows a transformed 3D mesh from a transformation based on fifty principal components of the mesh in FIG. 15A, according to an embodiment. The transformed 3D mesh 1509 is the corresponding 3D mesh 1501, with 50 principal components calculated and optimized. The table in FIG. 15F lists measures of fit, and shows improved fit over the transformation based on ten principle components 1507, though the improvement is not so dramatic as changing from one principal component (1505) to ten (1507). The first principal component represents the direction with the most variance, and subsequent principal components have decreasing impact on the overall model.

FIG. 15F shows a table of the different measures of fit between the second scan and the corresponding 3D mesh of FIG. 15A or the transformed 3D meshes of FIGS. 15B-E, according to various embodiments. The rows are the measures of fit discussed above, and the columns are the values of each measure between the second scan and corresponding 3D mesh or transformed 3D mesh for FIGS. 15A-E

FIGS. 16A-C show methods of generating a 3D model mesh to match a second scan of an object, according to various embodiments. Here, the object is a tooth. As discussed above, a tooth inside a patient's mouth is difficult to scan in its entirety.

FIG. 16A shows an embodiment that generates a 3D model mesh for a second scan by user choice of an initial model and transforming that initial model. In step 1601, the user chooses an initial model. This allows user preference to be considered, useful where a dental professional has a preferred library model. Step 1602 translates the initial model into an initial 3D model mesh, in the process detailed in FIG. 11. Because of the process of FIG. 11, the initial 3D model mesh can be transformed in not only the conventional Euclidean coordinates but by parametrizations such as principal components. Step 1603 transforms the initial 3D model mesh to a 3D model mesh that more closely fits the second scan.

FIG. 16B shows an embodiment that generates a 3D model mesh for a second scan by selecting an initial model from a plurality of models and transforming that initial model. Step 1604 shows a plurality of initial models. In one embodiment, this plurality may be a smile library. Step 1605 translates the plurality of initial models into a plurality of initial three-dimensional meshes, in the process detailed in FIG. 9. Step 1606 selects the initial three-dimensional mesh that most closely matches the second scan. Step 1607 transforms the initial three-dimensional mesh to a 3D model mesh that more closely fits the second scan.

FIG. 16C shows an embodiment that generates a 3D model mesh for a second scan by transforming at least one initial model into a plurality of initial 3D model meshes, and selecting the best fitting initial 3D model mesh. Where a 3D model mesh must be found quickly, this method may be faster, since it simply matches pre-existing initial three-dimensional meshes to second scans.

Step 1608 shows an example of the at least one initial model. In one embodiment, this may be a library crown. Step 1609 translates the at least one initial models into at least one initial 3D model mesh, in the process detailed in FIG. 9. Step 1610 generates a plurality of transformed 3D meshes, by transforming the at least one initial 3D model mesh through parametrizations, including but not limited to the parametrizations in FIG. 15. In one embodiment, this may be done in combination with a Gaussian distribution for various values of the parameters. Step 1611 selects the transformed 3D mesh that most closely matches the second scan as the 3D model mesh.

According to an embodiment, a computer program product embodied in a non-transitory computer readable medium is disclosed. The computer program product includes computer readable program code being executable by a hardware data processor to cause the hardware data processor to perform a method when said computer readable program code is executed by the hardware data processor. The method may include one or more functions that any of the system components to perform one or more steps of the method disclosed in one or more embodiments of this disclosure.

FIG. 17 shows embodiments of a method for moving a vertex based on its distance from the center and/or boundary of the planar mesh.

An embodiment moves at least one vertex based on its distance from a center and/or boundary of the planar mesh. Moving the vertices may allow for more even sampling for the sampled matrix, given that information is at times clustered in particular areas of the planar mesh. A vertex may be moved in several ways.

In one embodiment, the planar mesh is a unit circle, where the distance from the center of the circle to the boundary is 1.

Planar mesh 1700 is a unit circle which has center 1701, boundary 1702, and a vertex 1703.

Planar mesh 1710 is a unit circle with has center 1711, boundary 1712, and a vertex 1713. A line is drawn from the center 1711 through vertex 1713 to a point on boundary 1712. The distance 1715 from the center 1711 to vertex 1713 has a value of r. For example, r=0.5.

Planar mesh 1720 is a unit circle with has center 1721, boundary 1722, and a vertex 1723. A line is drawn from the center 1721 through vertex 1723 to a point on boundary 1722. The distance 1727 is has value r' and may be calculated based on the value of r (Distance 1715). Moved vertex 1726 is at a distance of r' from the center 1721 along line 1724 in the direction of boundary 1722.

In an embodiment, how far the vertex is moved depends on the degree of change desired; for a mild "stretch", the vertex to be moved may be moved towards the boundary by 10% of its original distance to the boundary; A more dramatic change may be performed by moving the vertex towards the boundary by 50% of its original distance from the boundary.

New distance r', based on the percentage change desired, b, may be:

$r'=r+b(1-r)$

In planar mesh 1720, for example, if b=0.1 and r=0.5, then r'=0.55, so moved vertex 1726 is 0.55 units from center 1721.

Planar mesh 1730 is a unit circle with has center 1731, boundary 1732, and a vertex 1733. A line is drawn from the center 1731 through vertex 1733 to a point on boundary 1732. The distance 1737 is has value r' and may be calculated based on the value of r (Distance 1715). Moved vertex 1736 is at a distance of r' from the center 1731 along line 1734 in the direction of boundary 1732.

In an embodiment, new distance r', may be:

$r'=-r^2+2r$

In planar mesh 1730, for example, if r=0.5, r'=0.75, so moved vertex 1736 is 0.75 units from center 1731.

Some or all of the vertices in a planar mesh may be moved.

The invention claimed is:

1. A computer-implemented method for generating a corresponding 3D mesh representing a 3D object, the method comprising transforming an initial three-dimensional mesh into a planar mesh, the initial three-dimensional mesh comprising a first set of vertices and edges and the planar mesh comprising a second set of vertices and edges, wherein each vertex of the second set of vertices is a transformation of a vertex from the first set of vertices and comprises values of the vertex from the first set of vertices, and each edge of the second set of edges is a transformation of an edge from the first set of edges and comprises values of the edge from the first set of edges;

sampling the planar mesh to generate a plurality of samples such that each sample from the plurality of samples comprises a three-dimensional coordinate comprising three numerical values representing a point in a three-dimensional space where the three numerical values are derived and/or taken directly from the initial three-dimensional mesh, and a coordinate comprising numerical values representing a position of the sample relative to other samples of the plurality of samples;

generating a sampled matrix based on the plurality of samples; and representing the sampled matrix as the corresponding 3D mesh, where the corresponding 3D mesh is a consistently connected mesh, where the consistently connected mesh has a consistent number of neighboring vertices for each vertex, unless said each vertex is on the boundary of the consistent connected mesh.

2. A method according to claim 1, further comprising moving at least one vertex of the planar mesh based on its distance from a center and/or boundary of the planar mesh.

3. A method according to claim 1, further comprising sampling the planar mesh with an irregular lattice.

4. A method according to claim 1, where the planar mesh is a unit circle.

5. A method according to claim 4, further comprising sampling the planar mesh is based on polar coordinates.

6. A method according to claim 1, further comprising a parametrization of the sampled matrix, wherein the parametrization finds at least one parameter that can represent or manipulate the characteristics of the corresponding 3D mesh of the sampled matrix.

7. A method according to claim 6, further comprising generating a transformed 3D mesh, wherein the transformed 3D mesh is generated by changing at least one value of the at least one parameter to transform the corresponding 3D mesh.

8. A method according to claim 1, further comprising fitting a 3D model mesh to at least partially match a second scan of a physical object, comprising the steps of:
- selecting an initial model by user choice;
- translating the initial model into the initial 3D model mesh;
- transforming the initial 3D model mesh into a transformed 3D mesh; and
- using the transformed 3D mesh as the 3D model mesh, where the 3D model mesh is a closer fit the second scan than the initial 3D model mesh.

9. A method according to claim 1, further comprising selecting a 3D model mesh to at least partially match a second scan, comprising the steps of:
- generating a plurality of initial 3D model meshes from a plurality of initial models, wherein each of the plurality of initial 3D model meshes is derived from one of the plurality of initial models;
- selecting an initial 3D model mesh from the plurality of initial 3D model meshes that most closely fits the second scan;
- transforming the initial 3D model mesh into a transformed 3D mesh; and
- using the transformed 3D mesh as the 3D model mesh, wherein the 3D model mesh is a closer fit the second scan than the initial three-dimensional mesh.

10. A method according to claim 1, further comprising selecting a 3D model mesh to at least partially match a second scan, comprising the steps of:
- generating a plurality of transformed 3D meshes from at least one initial 3D model mesh of at least one initial model; and
- selecting the transformed 3D mesh from the plurality of transformed 3D meshes with the closest fit to the second scan as the 3D model mesh.

11. A method according to claim 1, where the 3D model mesh is used to estimate an unscanned area and/or faultily scanned area.

* * * * *